(12) United States Patent
Kubota et al.

(10) Patent No.: US 10,809,498 B2
(45) Date of Patent: Oct. 20, 2020

(54) IMAGING LENS

(71) Applicant: KANTATSU CO., LTD., Tochigi (JP)

(72) Inventors: Yoji Kubota, Nagano (JP); Kenichi Kubota, Tochigi (JP); Hitoshi Hirano, Tochigi (JP); Hisao Fukaya, Tochigi (JP)

(73) Assignee: KANTATSU CO., LTD., Tokyo (JP)

( * ) Notice: Subject to any disclaimer, the term of this patent is extended or adjusted under 35 U.S.C. 154(b) by 123 days.

(21) Appl. No.: 16/165,258

(22) Filed: Oct. 19, 2018

(65) Prior Publication Data

US 2019/0179119 A1   Jun. 13, 2019

(30) Foreign Application Priority Data

Dec. 12, 2017  (JP) .................. 2017-237737

(51) Int. Cl.
*G02B 9/62* (2006.01)
*G02B 13/00* (2006.01)
*G02B 13/06* (2006.01)

(52) U.S. Cl.
CPC .......... *G02B 13/0045* (2013.01); *G02B 9/62* (2013.01); *G02B 13/06* (2013.01)

(58) Field of Classification Search
USPC ........................................ 359/761
See application file for complete search history.

(56) References Cited

U.S. PATENT DOCUMENTS

| 8,687,292 B2 * | 4/2014 | Tsai .................. G02B 9/62 359/761 |
| 2015/0198786 A1 | 7/2015 | Liao et al. |
| 2015/0241659 A1 | 8/2015 | Huang |

FOREIGN PATENT DOCUMENTS

JP   2017-037119 A   2/2017

OTHER PUBLICATIONS

Notice of Reason for Rejection for JP Patent Application No. 2017-237737, issued by JPO dated Jan. 17, 2020.

* cited by examiner

*Primary Examiner* — Darryl J Collins
(74) *Attorney, Agent, or Firm* — Kubotera & Associates, LLC

(57) ABSTRACT

An imaging lens includes a first lens having negative refractive power; a second lens having positive refractive power; a third lens having positive refractive power; a fourth lens having negative refractive power; a fifth lens; and a sixth lens having negative refractive power, arranged in this order from an object side to an image plane side. The fourth lens is formed in a shape so that a surface thereof on the image plane side is convex near an optical axis thereof.

18 Claims, 21 Drawing Sheets

IMAGING LENS

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small camera such as a camera to be built in an onboard camera, a smartphone, a cellular phone, a digital camera, a digital video camera, a network camera, a TV conference camera, a fiber scope, and a capsule endoscope.

In these years, some vehicles are equipped with a plurality of cameras for improving safety and/or convenience. For example, as a camera to support safely backing a vehicle, there is a backup camera. For example, in case of a vehicle equipped with a backup camera, the view behind the vehicle is displayed on a monitor upon backing the vehicle. Since the driver can visually see the object even if the object is invisible due to shadow behind the vehicle, the driver can safely back the vehicle without hitting an obstacle. Such camera for mounting in a vehicle, so-called "onboard camera", is expected to be continuously in more demand.

Such onboard cameras may be mounted in relatively small spaces, such as a back door, a front grille, a side mirror, and interior space thereof. For this reason, an imaging lens for mounting in an onboard camera is strongly required to have a compact size, in addition to attaining a high resolution suitable for a higher pixel count of an imaging element and a wide angle of view to achieve a wider range of an image. However, when the downsizing of the imaging lens is attempted, each lens has strong refractive power, and it is often harder to satisfactorily correct aberrations. Upon actual designing of an imaging lens, it is a key to achieve those plural requirements such as satisfactory correction of aberrations, a wider angle of view, and downsizing in a balanced manner.

On the other hand, in place of cellular phones that are intended mainly for making phone calls, so-called "smartphones", i.e., multifunctional cellular phones which can run various application software as well as a voice call function, have been more widely used. The product lineup of smartphones is very wide including beginner models to high-end models, and is often categorized by performance of hardware, optical performance of a camera, etc. Among those high-end models, there is a model that is intended to have new added value by being equipped with two imaging lenses. For example, in case of a model having an imaging lens of a wide angle of view as well as a conventional imaging lens of typical angle of view, images from those two imaging lenses are synthesized by software processing so as to achieve smooth zooming in and zooming out. In case of those imaging lenses for such purpose, similarly to imaging lenses of the onboard camera, it is required to have further smaller size of the imaging lens, as well as satisfactory correction of aberrations and a wider angle of view.

For example, as the conventional imaging lens having a wide angle of view, an imaging lens described in Patent Reference has been known.

Patent Reference: Japanese Patent Application Publication No. 2017-037119

The conventional imaging lens described in Patent Reference includes a first lens, a second lens, a third lens, a stop, a fourth lens, a fifth lens and a sixth lens, arranged in the order from an object side. The first lens has a concave surface thereof on an image plane side and has negative refractive power. The second lens is a meniscus lens directing a concave surface thereof to the object side. The third lens has a biconvex shape near the optical axis and has positive refractive power. The fourth lens has negative refractive power, and the fifth lens has positive refractive power. The sixth lens has an aspheric surface at least on one of the surfaces thereof. In case of an imaging lens with a wide angle, the first lens tends to have a large outer shape. In this point, according to the conventional imaging lens of Patent Reference, while having a wide angle, the enlargement of the first lens is restricted and the field curvature is satisfactorily corrected.

According to the conventional imaging lens disclosed in Patent Reference, although the number of lenses that composes the conventional imaging lens is as small as six, the angle of imaging view is wide and aberrations are relatively satisfactorily corrected. However, since the total length of the lens system is long for the focal length, such imaging lens does not satisfy the requirements of these days for downsizing, and it was difficult to satisfy both small size of the imaging lens and satisfactory correction of aberrations. Here, such a problem is not specific to the imaging lens to be mounted in onboard cameras and smartphones. Rather, it is a common problem for an imaging lens to be mounted in a relatively small camera such as cellular phones, digital cameras, digital video cameras, network cameras, TV conference cameras, fiber scopes, and capsule endoscope.

In view of the above-described problems in the conventional techniques, an object of the present invention is to provide an imaging lens that can attain a wider angle of imaging view and satisfactory correction of aberrations, while achieving a small size.

Further objects and advantages of the present invention will be apparent from the following description of the invention.

SUMMARY OF THE INVENTION

In order to attain the objects described above, according to a first aspect of the present invention, an imaging lens of the invention includes a first lens having negative refractive power, a second lens having positive refractive power, a third lens having positive refractive power, a fourth lens having negative refractive power, a fifth lens, and a sixth lens having negative refractive power, arranged in the order from an object side to an image plane side. The fourth lens is formed in a shape such that an image plane-side surface has a convex shape near the optical axis.

In attaining a wider angle of view of the imaging lens, correction of a field curvature is important. According to the imaging lens of the first aspect of the invention, the refractive powers of the four lenses are arranged in a well-balanced manner, "negative-positive-positive-negative" in the order from the object side. Accordingly, the aberrations generated in the first lens are suitably corrected by two lenses having positive refractive powers and the fourth lens having negative refractive power. The fourth lens L4 is formed in a shape such that an surface thereof on the image plane side has a convex shape near the optical axis, i.e., a curvature radius of the image plane-side surface thereof is negative. With such shape of the fourth lens, it is achievable to downsize the imaging lens and to satisfactorily correct the field curvature. Here, when the image plane-side surface of the fourth lens is formed to have a concave shape near the optical axis, it is difficult to secure back focus. In addition, the peripheral portion of the image-forming surface curves to the object side, and the field curvature is insufficiently corrected. Therefore, it is difficult to obtain satisfactory image-forming performance.

According to a second aspect of the imaging lens having the above-described configuration, the fourth lens is preferably formed in a shape such that the refractive power thereof gets stronger as it goes from the optical axis to the lens peripheral portion and image plane-side surface thereof is formed as an aspheric surface having an inflexion point and so as to have a convex shape near the optical axis.

In case of an imaging lens having a wide angle of view, chromatic aberration of magnification is easily generated at the peripheral portion of an image. In order to enhance resolution of the imaging lens, it is important to correct the chromatic aberration of magnification generated at the peripheral portion. According to the imaging lens of the second aspect of the invention, the aberrations generated in the first lens are suitably corrected by two lenses having positive refractive powers and the fourth lens having negative refractive power. The fifth lens and the sixth lens further correct the aberrations that was not completely corrected by the respective lenses from the second to the fourth lenses.

In the above-described configuration, forming the fourth lens in a shape such that the refractive power thereof gets stronger from the optical axis to the lens peripheral portion, the fourth lens can have a shape such that the refractive power gets stronger from the lens center to the peripheral portion. Therefore, it is achievable to satisfactorily correct the chromatic aberration from the center of an image to the peripheral portion. In addition, the image plane-side surface of the fourth lens has an aspheric shape having an inflexion point and has a convex shape near the optical axis. Therefore, it is achievable to suitably restrain an incident angle of a light beam emitted from the imaging lens to the image plane of an imaging element within the range of chief ray angle (CRA). According to the imaging lens having the above-described configuration, the first lens is preferably formed in a shape such that the image plane-side surface thereof has a concave shape and the fourth lens is formed so as to have a shape of a meniscus lens directing a concave surface thereof to the object side. With such shapes of the first lens and the fourth lens, it is achievable to satisfactorily correct the distortion and the field curvature that are easily generated in an imaging lens having a wide angle of view. Here, "a lens having a shape of a meniscus lens" herein means "a lens that generally has a meniscus shape". Therefore, when the lens has a shape of meniscus lens, the lens may have a shape of a biconcave lens near the optical axis, a shape of flat concave lens near the optical axis, or a shape not having refractive power near the optical axis, as well as a shape of a meniscus lens near the optical axis, as long as the lens generally has a shape of a meniscus lens.

According to the imaging lens having the above-described configuration, the fifth lens is preferably formed in a shape such that the object-side surface thereof has an aspheric shape having an inflection point and has a convex shape near the optical axis. With such shape of the fifth lens, it is achievable to suitably restrain the incident angle of a light beam emitted from the imaging lens to the image plane within the range of CRA and satisfactorily correct the chromatic aberration of magnification.

According to the imaging lens having the above-described configuration, the fifth lens is preferably formed in a shape such that the image plane-side surface thereof has an aspheric shape having an inflection point and has a concave shape near the optical axis. With such shape of the fifth lens, it is achievable to suitably restrain the incident angle of a light beam emitted from the imaging lens to the image plane within the range of CRA and satisfactorily correct the astigmatism and the field curvature.

According to a third aspect of the invention, when a composite focal length of the first lens, the second lens, the third lens and the fourth lens is F1, the imaging lens having the above-described configuration preferably satisfies the following conditional expression (1):

$$0 < F1 \tag{1}$$

When the imaging lens of the invention satisfies the conditional expression (1), it is achievable to satisfactorily correct the astigmatism, the distortion, and the chromatic aberration, while downsizing the imaging lens. When the composite focal length F1 is outside the range of the conditional expression (1) and is negative, the composite refractive power of the fifth lens and the sixth lens is positive and the refractive power is strong. Therefore, it is difficult to downsize the imaging lens. In addition, the distortion increases in a negative direction, and an axial chromatic aberration is excessively corrected (a focal position at a short wavelength moves to the image plane side relative to a focal position at a reference wavelength). The chromatic aberration of magnification is insufficiently corrected (an image-forming point at a short wavelength moves closer to the optical axis relative to an image-forming point at a reference wavelength). Therefore, it is difficult to obtain satisfactory image-forming performance.

According to a fourth aspect of the invention, when the composite focal length of the fifth lens and the sixth lens is F2, the imaging lens having the above-described configuration preferably satisfies the following conditional expression (2):

$$0 < F2 \tag{2}$$

When the imaging lens satisfies the conditional expression (2), it is achievable to satisfactorily correct the chromatic aberration, the astigmatism and the distortion, while downsizing the imaging lens. When the value of the composite focal length F2 is outside the range of the conditional expression (2), while it is advantageous for correction of distortion, the axial chromatic aberration is insufficiently corrected (a focal position at a short wavelength moves to the object side relative to a focal position at a reference wavelength). The chromatic aberration of magnification is excessively corrected (an image-forming point at a short wavelength moves in a direction away from the optical axis relative to an image-forming point at a reference wavelength). In addition, a sagittal image surface of the astigmatism curves to the object side and an astigmatic difference increases. Therefore, it is difficult to obtain satisfactory image-forming performance.

According to the imaging lens having the above-described configuration, it is preferred to dispose an aperture stop between the first lens and the second lens. Here, in this specification, "between the first lens and the second lens" means "between a tangential plane of a vertex of the object-side surface of the first lens and a tangential plane of a vertex of the image plane-side surface of the second lens". Disposing the aperture stop in such position, it is achievable to suitably restrain the incident angle of a light beam emitted from the imaging lens to the image plane within the CRA range and to satisfactorily correct the aberrations.

According to a fifth aspect of the invention, when the whole lens system has the focal length f and a distance on the optical axis between the first lens and the second lens is D12, the imaging lens having the above-described configuration preferably satisfies the following conditional expression (3):

$$0.05 < D12/f < 0.8 \tag{3}$$

When the imaging lens satisfies the conditional expression (3), it is achievable to satisfactorily correct the field curvature and the astigmatism, while downsizing the imaging lens. When the value exceeds the upper limit of "0.8", the sagittal image surface of the astigmatism curves to the image plane side and the astigmatic difference increases. In addition, the image-forming surface curves to the image plane side and the field curvature is excessively corrected. On the other hand, when the value is below the lower limit of "0.05", while it is advantageous for downsizing of the imaging lens, the sagittal image surface of the astigmatism curves to the object side and the astigmatic difference increases. In addition, the field curvature is insufficiently corrected. Therefore, in either case, it is difficult to obtain satisfactory image-forming performance.

According to a sixth aspect of the invention, when the second lens has a focal length f2 and the third lens has a focal length f3, the imaging lens having the above-described configuration preferably satisfies the following conditional expression (4):

$$0.5 < f2/f3 < 3 \tag{4}$$

When the imaging lens satisfies the conditional expression (4), it is achievable to satisfactorily correct the chromatic aberration, the astigmatism and the field curvature, while downsizing the imaging lens. When the value exceeds the upper limit of "3", it is difficult to downsize the imaging lens, and the chromatic aberration of magnification for the off-axis light is insufficiently corrected. Furthermore, the sagittal image surface of the astigmatism curves to the image plane side, and the astigmatic difference increases. In addition, the field curvature is excessively corrected. On the other hand, when the value is below the lower limit of "0.5", while it is advantageous to downsize the imaging lens, it is difficult to secure back focus. Furthermore, the sagittal image surface of the astigmatism curves to the object side and the astigmatic difference increases. In addition, the field curvature is insufficiently corrected. Therefore, in either case, it is difficult to obtain satisfactory image-forming performance.

According to a seventh aspect of the invention, when the whole lens system has a focal length f and a composite focal length of the second lens and the third lens is f23, the imaging lens having the above-described configuration preferably satisfies the following conditional expression (5):

$$0.3 < f23/f < 1.2 \tag{5}$$

When the imaging lens satisfies the conditional expression (5), it is achievable to satisfactorily correct the chromatic aberration, astigmatism and the field curvature, while downsizing the imaging lens. When the value exceeds the upper limit of "1.2", the chromatic aberration of magnification is insufficiently corrected. Furthermore, the sagittal image surface of the astigmatism curves to the object side and the astigmatic difference increases. In addition, the field curvature is insufficiently corrected. On the other hand, when the value is below the lower limit of "0.3", while it is advantageous to downsize the imaging lens, the axial chromatic aberration is excessively corrected and the field curvature is excessively corrected. Therefore, in either case, it is difficult to obtain satisfactory image-forming performance.

According to an eighth aspect of the invention, in order to correct the aberrations more satisfactorily, the imaging lens having the above-described configuration preferably satisfies the following conditional expression (5A):

$$0.3 < f23/f < 1.0 \tag{5A}$$

According to a ninth aspect of the invention, when the first lens has Abbe's number ν1, the second lens has Abbe's number ν2, and the third lens has Abbe's number ν3, the imaging lens having the above-described configuration preferably satisfies the following conditional expressions (6) through (8):

$$40 < \nu1 < 75 \tag{6}$$

$$40 < \nu2 < 75 \tag{7}$$

$$40 < \nu3 < 75 \tag{8}$$

When the imaging lens satisfies the conditional expressions (6) through (8), it is achievable to satisfactorily correct the chromatic aberration. When the three lenses from the object side are formed of low-dispersion materials, it is achievable to suitably restrain generation of the chromatic aberration in the imaging lens. When the value exceeds the upper limit of "75", the axial chromatic aberration and the chromatic aberration of magnification are excessively corrected. Therefore, it is difficult to obtain satisfactory image-forming performance. On the other hand, when the value is below the lower limit of "40", the axial chromatic aberration and the chromatic aberration of magnification are both insufficiently corrected. Therefore, it is difficult to obtain satisfactory image-forming performance.

According to a tenth aspect of the invention, when the whole lens system has a focal length f and the fourth lens has a focal length f4, the imaging lens having the above-described configuration preferably satisfies the following conditional expression (9):

$$-4 < f4/f < -0.4 \tag{9}$$

When the value satisfies the conditional expression (9), it is achievable to satisfactorily correct the chromatic aberration and the astigmatism. When the value exceeds the upper limit of "-0.4", although it is advantageous for correction of the chromatic aberration, the astigmatic difference increases at the peripheral portion of an image. Therefore, it is difficult to obtain satisfactory image-forming performance. On the other hand, when the value is below the lower limit of "-4", the chromatic aberration of magnification is excessively corrected. Furthermore, the sagittal image surface of the astigmatism curves to the image plane side, and the astigmatic difference increases. In addition, the field curvature is excessively corrected. Therefore, in either case, it is difficult to obtain satisfactory image-forming performance.

According to an eleventh aspect of the invention, when the image plane side surface of the fourth lens has an effective diameter Φ4B and the object side surface of the fifth lens has an effective diameter Φ5A, the imaging lens having the above-described configuration preferably satisfies the following conditional expression (10):

$$1 < \Phi5A/\Phi4B < 2 \tag{10}$$

When the imaging lens satisfies the conditional expression (10), it is achievable to suitably restrain the incident angle of a light beam emitted from the imaging lens to the image plane within the range of CRA, while achieving small size and a wide angle of view of the imaging lens. When the value exceeds the upper limit of "2", a difference between the effective diameter Φ4B and the effective diameter Φ5A is large, and the incident angle of the light beam emitted from the imaging lens to the image plane is large. Therefore, it is difficult to restrain the incident angle within the range of CRA. On the other hand, when the value is below the lower limit of "1", while it is easy to restrain the incident angle within the range of CRA, it is difficult to achieve small size and a wide angle of view of the imaging lens.

According to a twelfth aspect of the invention, when the fifth lens has a focal length f5 and the sixth lens has a focal length f6, the imaging lens having the above-described configuration preferably satisfies the following conditional expression (11):

$$0.3<|f5|/|f6|<1.5 \qquad (11)$$

When the imaging lens satisfies the conditional expression (11), it is achievable to satisfactorily correct the chromatic aberration, the astigmatism, and the field curvature, while restraining the incident angle of a light beam emitted from the imaging lens to the image plane within the range of CRA. When the value exceeds the upper limit of "1.5", the axial chromatic aberration is insufficiently corrected and the chromatic aberration of magnification is excessively corrected. In addition, it is difficult to restrain the incident angle emitted from the imaging lens to the image plane within the range of CRA. On the other hand, when the value is below the lower limit of "0.3", while it is easy to restrain the incident angle within the CRA range, the sagittal image surface of the astigmatism curves to the image plane side and the astigmatic difference increases. In addition, the field curvature is excessively corrected. Therefore, in either case, it is difficult to obtain satisfactory image-forming performance.

According to a thirteenth aspect of the invention, when the whole lens system has a focal length f and the sixth lens has a focal length f6, the imaging lens having the above-described configuration preferably satisfies the following conditional expression (12):

$$-5<f6/f<-0.5 \qquad (12)$$

When the imaging lens satisfies the conditional expression (12), it is achievable to satisfactorily correct the chromatic aberration, while downsizing the imaging lens. When the imaging lens satisfies the conditional expression (12), it is achievable to suitably restrain the incident angle of a light beam emitted from the imaging lens to the image plane within the range of CRA. When the value exceeds the upper limit of "−0.5", while it is advantageous for downsizing the imaging lens, it is difficult to restrain the incident angle emitted from the imaging lens to the image plane within the range of CRA. In addition, the chromatic aberration of magnification is excessively corrected at the peripheral portion of an image. Therefore, it is difficult to obtain satisfactory image-forming performance. On the other hand, when the value is below the lower limit of "−5", the chromatic aberration of magnification for the off-axis light fluxes is insufficiently corrected. Therefore, also in this case, it is difficult to obtain satisfactory image-forming performance.

According to a fourteenth aspect of the invention, when the sixth lens has Abbe's number ν6, the imaging lens having the above-described configuration preferably satisfies the following conditional expression (13):

$$10<\nu 6<40 \qquad (13)$$

When the imaging lens satisfies the conditional expression (13), it is achievable to satisfactorily correct the chromatic aberration. When the value exceeds the upper limit of "40", the axial chromatic aberration and the chromatic aberration of magnification are insufficiently corrected. On the other hand, when the value is below the lower limit of "10", the axial chromatic aberration and the chromatic aberration of magnification are excessively corrected. Therefore, in either case, it is difficult to obtain satisfactory image-forming performance.

According to a fifteenth aspect of the invention, when the distance on the optical axis between the first lens and the second lens is D12 and the distance on the optical axis between the fifth lens and the sixth lens is D56, the imaging lens having the above-described configuration preferably satisfies the following conditional expression (14):

$$D56<D12 \qquad (14)$$

When the imaging lens satisfies the conditional expression (14), it is achievable to satisfactorily correct the coma aberration and the astigmatism, while securing the back focus. When the imaging lens does not satisfy the conditional expression (14), it is difficult to secure back focus. In addition, the astigmatic difference increases and the outer coma aberration increases for the off-axis light fluxes. Therefore, it is difficult to obtain satisfactory image-forming performance.

According to a sixteenth aspect of the invention, when the whole lens system has the focal length f and a distance on the optical axis between the fifth lens and the sixth lens is D56, the imaging lens having the above-described configuration preferably satisfies the following conditional expression (15):

$$0.05<D56/f<0.35 \qquad (15)$$

When the imaging lens satisfies the conditional expression (15), it is achievable to satisfactorily correct the chromatic aberration, while securing the back focus. When the value exceeds the upper limit of "0.35", although it is advantageous for correction of the chromatic aberration, it is difficult to secure the back focus. On the other hand, when the value is below the lower limit of "0.05", although it is easy to secure the back focus, the axial chromatic aberration and the chromatic aberration of magnification are both excessively corrected. Therefore, it is difficult to obtain satisfactory image-forming performance.

According to a seventeenth aspect of the invention, when the object-side surface of the first lens has an effective diameter $\Phi 1A$ and the image plane-side surface of the sixth lens has an effective diameter $\Phi 6B$, the imaging lens having the above-described configuration preferably satisfies the following conditional expression (16):

$$\Phi 1A<\Phi 6B \qquad (16)$$

The object-side surface of the first lens disposed closest to the object side may be exposed to the most severe environment, such as exposure to liquid, e.g., water. In case of a conventional wide-angle imaging lens, typically, the first lens is large. Therefore, when such conventional imaging lens is mounted in a vehicle for an onboard camera, the size could be an issue. Moreover, on an object-side surface of the first lens, an optical thin film may be frequently formed so as to attain environmental resistance. When the imaging lens satisfies the conditional expression (16), it is achievable to reduce an exposed area of the first lens, which contacts with surrounding environment. With the small diameter of the first lens, it is achievable to reduce the cost of the optical thin film, which in turn reduces the manufacturing cost of the imaging lens.

According to an eighteenth aspect of the invention, when the distance on the optical axis from the object-side surface of the first lens to the image plane is La and the maximum image height of the image plane is Hmax, the imaging lens having the above-described configuration preferably satisfies the following conditional expression (17):

$$0.2 < La/H \max < 1.5 \quad (17)$$

In case of an imaging lens to be mounted in a thin smartphone, or the like, it is necessary to hold the imaging lens within a limited space. Therefore, the total length of the imaging lens is strictly limited. Furthermore, as the angle of view of the imaging lens is wider, it is important not merely to have a small size but also to make the ratio of the total length of the imaging lens to the size of the image plane as small as possible, i.e., how to achieve low profile is important. When the imaging lens satisfies the conditional expression (17), it is possible to attain low profile of the imaging lens. Here, between the imaging lens and the image plane, typically, there is often disposed an insert such as an infrared cut-off filter and cover glass. In this specification, for the distance on the optical axis of those inserts, an air conversion length is employed.

According to the invention, the respective lenses from the first lens to the sixth lens are preferably disposed with certain air intervals. When the respective lenses are disposed at certain air intervals, the imaging lens of the invention can have a lens configuration that does not contain any cemented lens. In such lens configuration like this, since it is easy to form all of the six lenses that compose the imaging lens from plastic materials, it is achievable to suitably restrain the manufacturing cost of the imaging lens.

Recently, an imaging element with high pixel count is more frequently combined with an imaging lens for a purpose of improving performance of a camera. In case of such an imaging element with a high pixel count, a light-receiving area of each pixel decreases, so that an image tends to be dark. As a method of correcting the darkness of the image, there is a method of improving light-receiving sensitivity of the imaging element by using an electrical circuit. However, when the light-receiving sensitivity increases, a noise component, which does not directly contribute to formation of an image, is also amplified. Therefore, it is necessary to have another circuit to reduce the noise. Accordingly, in order to obtain fully bright image without such electrical circuit, when the whole lens system has the focal length f and the imaging lens has a diameter of entrance pupil Dep, the imaging lens having the above-described configuration preferably satisfies the following conditional expression (18):

$$f/Dep < 2.6 \quad (18)$$

According to the invention, when the imaging lens has an angle of view $2\omega$, the imaging lens preferably satisfies $120° \leq 2\omega$. When the imaging lens satisfies this conditional expression, it is possible to attain a wide angle of the imaging lens and it is achievable to suitably attain both downsizing and the wider angle of view of the imaging lens.

According to the present invention, as described above, the shapes of the lenses are specified using positive/negative signs of the curvature radii thereof. Whether the curvature radius of the lens is positive or negative is determined based on general definition. More specifically, taking a traveling direction of light as positive, if a center of a curvature radius is on the image plane side when viewed from a lens surface, the curvature radius is positive. If a center of a curvature radius is on the object side, the curvature radius is negative. Therefore, "an object-side surface having a positive curvature radius" means the object-side surface is a convex surface. "An object-side surface having a negative curvature radius" means "the object side surface is a concave surface". In addition, "an image plane-side surface having a positive curvature radius" means "the image plane-side surface is a concave surface". "An image plane-side surface having a negative curvature radius" means the image plane-side surface is a convex surface. Here, a curvature radius used herein refers to a paraxial curvature radius, and may not fit to general shapes of the lenses in their sectional views all the time.

According to the imaging lens of the invention, it is achievable to provide an imaging lens having a wide angle of view, which is especially suitable for mounting in a small-sized camera, while having high resolution with satisfactory correction of aberrations.

DETAILED DESCRIPTION OF PREFERRED EMBODIMENTS

Figure 1:
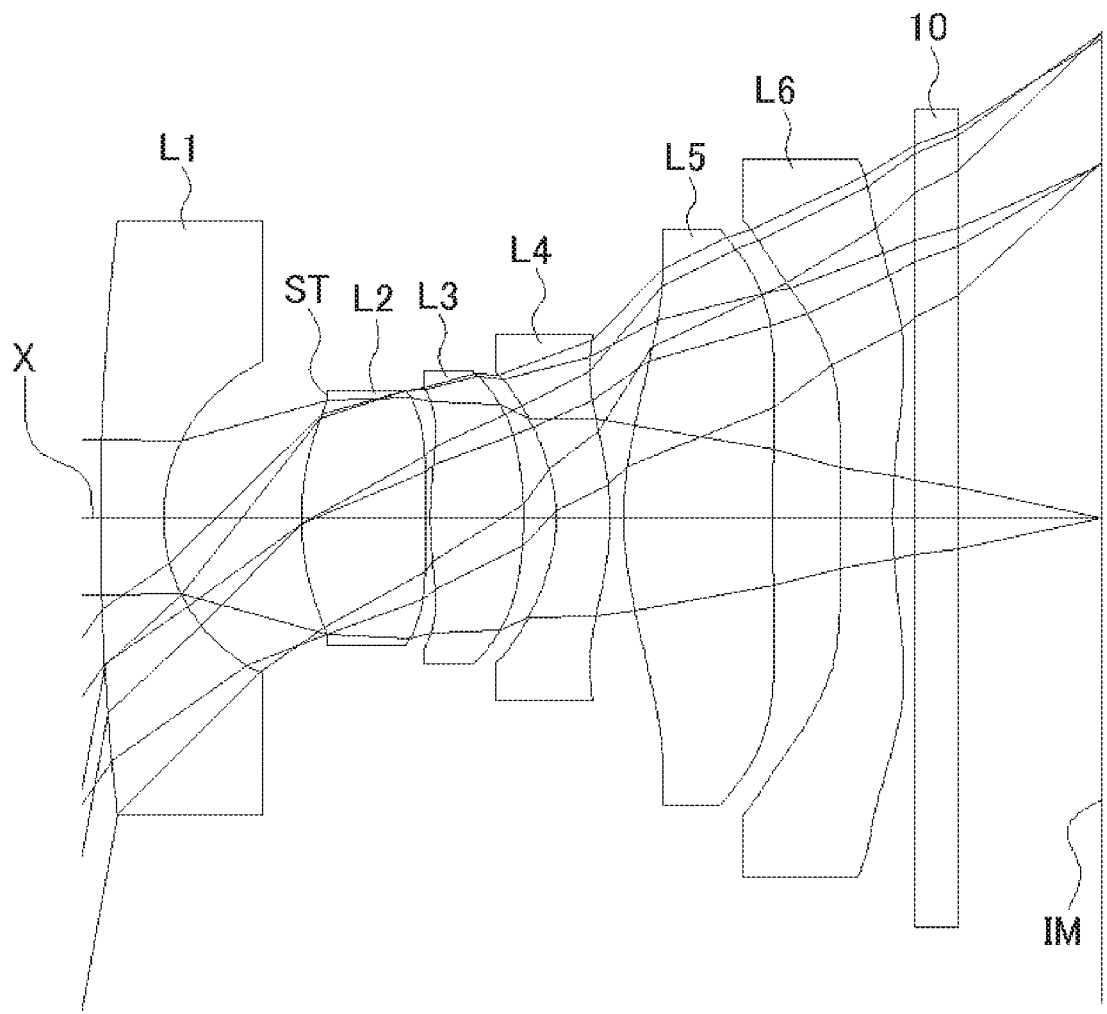
FIG. 1 is a sectional view of a schematic configuration of an imaging lens in Numerical Data Example 1 of the present invention.

Hereunder, referring to the accompanying drawings, an embodiment of the present invention will be fully described.

FIGS. 1, 4, 7, 10, 13, 16, and 19 are schematic sectional views of the imaging lenses in Numerical Data Examples 1 to 7 according to the embodiment, respectively. Since the imaging lenses in those Numerical Data Examples have the same basic configuration, the lens configuration of the embodiment will be described with reference to the illustrative sectional view of Numerical Data Example 1.

The imaging lens of the embodiment includes a first lens L1 having negative refractive power; a second lens L2 having positive refractive power; a third lens L3 having positive refractive power; a fourth lens L4 having negative refractive power; a fifth lens L5, and a sixth lens L6 having negative refractive power, arranged in the order from an object side. Between the first lens L1 and the second lens L2, there is disposed an aperture stop ST. According to the imaging lenses of the embodiment, the aperture stop ST is provided on an object-side surface of the second lens L2. In addition, between the sixth lens L6 and an image plane IM of an imaging element, there is provided a filter 10. The filter 10 is omissible.

The first lens L1 is formed in a shape such that an image plane-side surface thereof is concave. According to the imaging lens of Numerical Data Example 1, the first lens L1 is formed in a shape such that a curvature radius r1 of a surface thereof on the object-side and a curvature radius r2 of a surface thereof on the image plane side are both positive, so as to have a shape of a meniscus lens directing a convex surface thereof to the object side near the optical axis. Here, the shape of the first lens L1 may not be limited to the one in Numerical Data Example 1. The first lens L1 can be formed in a shape such that the curvature radius r1 is negative and the curvature radius r2 is positive, so as to have a shape of a biconcave lens near the optical axis. Numerical Data Example 3 is an example that the first lens L1 has a shape of a biconcave lens near the optical axis. The first lens L1 can be formed in any shape as long as the curvature radius r2 of the image plane-side surface thereof is positive.

The second lens L2 is formed in a shape such that a curvature radius r3 of a surface thereof on the object-side and a curvature radius r4 of a surface thereof on the image plane side are both positive, so as to have a shape of a meniscus lens directing a convex surface thereof to the object side near an optical axis. Here, the shape of the second lens L2 is not limited to the one in Numerical Data Example 1. The second lens L2 can be formed in a shape such that the curvature radius r3 is positive and the curvature radius r4 is negative, so as to have a shape of a biconvex lens near the optical axis. Numerical Data Examples 3, 6, and 7 are examples, in which the second lens L2 has a shape of a biconvex lens near the optical axis. The second lens L2 can be formed in any shape as long as the curvature radius r3 of the object side surface thereof is positive.

The third lens L3 is formed in a shape such that a curvature radius r5 of a surface thereof on the object-side is positive and a curvature radius r6 of a surface thereof on the image plane side is negative, so as to have a shape of a biconvex lens near the optical axis. Here, the shape of the third lens L3 is not limited to the one in Numerical Data Example 1. The third lens L3 can be formed in a shape of a meniscus lens directing a convex surface thereof to the object side near the optical axis, or can be formed in a shape of a meniscus lens directing a concave surface thereof to the object side near the optical axis.

The fourth lens L4 is formed in a shape such that a curvature radius r7 of a surface thereof on the object-side and a curvature radius r8 of a surface thereof on the image plane side are both negative, so as to have a shape of a meniscus lens directing a concave surface thereof to the object side near an optical axis. The fourth lens L4 is formed in a shape so as to have stronger refractive power as it goes from the optical axis X towards the lens peripheral portion. The fourth lens L4 is formed in a shape such that a surface thereof on the image plane side has an aspheric shape having an inflection point so as to have a convex shape near the optical axis. Here, the shape of the fourth lens L4 near the optical axis is not limited to the one in Numerical Data Example 1. For example, the fourth lens L4 can be formed in a shape so as to have a shape of a biconcave lens near the optical axis, or to have a shape of a meniscus lens directing a convex surface thereof to the object side near the optical axis. In order to more satisfactorily correct the aberrations, the fourth lens L4 is preferably formed in a shape so as to generally have a shape of a meniscus directing a concave surface thereof to the object side.

The fifth lens L5 is formed in a shape such that the object-side surface thereof has a convex shape near the optical axis and the image plane-side surface thereof has a concave shape near the optical axis. According to the imaging lens of Numerical Data Example 1, the fifth lens L5 is formed in a shape such that a curvature radius r9 of a surface thereof on the object-side and a curvature radius r10 of a surface thereof on the image plane side are both positive, so as to have a shape of meniscus lens directing a convex surface thereof to the object side near the optical axis. In addition, the fifth lens L5 is formed as an aspheric shape having an inflection point on both of the object-side and the image plane-side surfaces. Here, the shape of the fifth lens L5 near the optical axis is not be limited to the one in Numerical Data Example 1.

The sixth lens L6 is formed in a shape such that a curvature radius r11 of a surface thereof on the object-side and a curvature radius r12 of a surface thereof on the image plane side are both positive, so as to have a shape of a meniscus lens directing a convex surface thereof to the object side near an optical axis. The sixth lens L6 is formed as an aspheric shape such that a surface thereof on the image plane side has an inflection point. Here, the shape of the sixth lens L6 near the optical axis may not be limited to the one in Numerical Data Example 1. Numerical Data Examples 3 and 4 are examples that the sixth lens L6 has a shape of a biconcave lens near the optical axis. On the other hand, the sixth lens L6 of Numerical Data Example 7 is an example of a shape of a meniscus lens directing a concave surface thereof to the object side near the optical axis.

According to the embodiment, the imaging lens satisfied the following conditional expressions (1) through (18):

$$0 < F1 \tag{1}$$

$$0 < F2 \tag{2}$$

$0.05 < D12/f < 0.8$        (3)

$0.5 < f2/f3 < 3$        (4)

$0.3 < f23/f < 1.2$        (5)

$0.3 < f23/f < 1.0$        (5A)

$40 < v1 < 75$        (6)

$40 < v2 < 75$        (7)

$40 < v3 < 75$        (8)

$-4 < f4/f < -0.4$        (9)

$1 < \Phi 5A/\Phi 4B < 2$        (10)

$0.3 < |f5|/|f6| < 1.5$        (11)

$-5 < f6/f < -0.5$        (12)

$10 < v6 < 40$        (13)

$D56 < D12$        (14)

$0.05 < D56/f < 0.35$        (15)

$\Phi 1A < \Phi 6B$        (16)

$0.2 < La/H\,\mathrm{max} < 1.5$        (17)

$f/Dep < 2.6$        (18)

In the above conditional expressions,
f: Focal length of the whole lens system
f2: Focal length of the second lens L2
f3: Focal length of the third lens L3
f4: Focal length of the fourth lens L4
f5: Focal length of the fifth lens L5
f6: Focal length of the sixth lens L6
f23: Composite focal length of the second lens L2 and the third lens L3
F1: Composite focal length of the first lens L1 through the fourth lens L4
F2: Composite focal length of the fifth lens L5 and the sixth lens L6
Φ1A: Effective diameter of an object-side surface of the first lens L1
Φ4B: Effective diameter of an image plane-side surface of the fourth lens L4
Φ5A: Effective diameter of an object-side surface of the fifth lens L5
Φ6B: Effective diameter of an image plane-side surface of the sixth lens L6
D12: Distance along the optical axis X between the first lens L1 and the second lens L2
D56: Distance along the optical axis X between the fifth lens L5 and the sixth lens L6
La: Distance on an optical axis from the object-side surface of the first lens L1 to the image plane IM (an air conversion length is employed for the filter 10)
v1: Abbe's number of the first lens L1
v2: Abbe's number of the second lens L2
v3: Abbe's number of the third lens L3
v6: Abbe's number of the sixth lens L6
Hmax: Maximum image height of the image plane IM
Dep: Diameter of entrance pupil Here, it is not necessary to satisfy all of the conditional expressions, and it is achievable to obtain an effect corresponding to the respective conditional expression when any single one of the conditional expressions is individually satisfied.

According to the embodiment, any of the lenses that lenses that compose the imaging lens is made from a plastic material. Since plastic materials are light-weighted and inexpensive, so that they have been used as lens materials for imaging lenses to be mounted in portable devices such as smartphones in these years. Typically, plastic lenses are formed by pouring molten plastic material into a mold. For this reason, fluidity of the plastic material is very important to form the material into a desired shape.

Therefore, in order to achieve both miniaturization of the imaging lens and satisfactory correction of aberrations, while securing fluidity upon molding a lens, the fourth lens L4 preferably satisfies the following conditional expression. According to the embodiment, the imaging lens satisfied the following conditional expression:

$1.5 < E4/T4 < 3$

In the above conditional expression, T4: Thickness of a fourth lens L4 on an optical axis E4: Edge thickness of an object-side surface of the fourth lens L4 along the optical axis at the effective diameter thereof.

According to the embodiment, lens surfaces of the respective lenses, the first lens L1 through the sixth lens L6, are formed as aspheric surfaces as necessary. An equation that express those aspheric surfaces is shown below:

$$Z = \frac{C \cdot H^2}{1 + \sqrt{1 - (1+k) \cdot C^2 \cdot H^2}} + \sum (An \cdot H^n) \quad \text{[Equation 1]}$$

In the above formula,
Z: Distance in a direction of the optical axis
H: Distance from the optical axis in a direction perpendicular to the optical axis
C: Paraxial curvature (=1/r, r: paraxial curvature radius)
k: Conic constant
An: The nth aspheric coefficient Next, Numerical Data Examples of the imaging lens of the embodiment will be described. In each Numerical Data Example, f represents a focal length of the whole lens system, Fno represents an F-number, and ω represents a half angle of view, respectively. In addition, i represents a surface number counted from the object side, r represents a curvature radius, d represents a distance on the optical axis between lens surfaces (surface spacing), n represents a refractive index at an e line, and ν represents an Abbe's number at e line, respectively. Here, aspheric surfaces are indicated with surface numbers i affixed with * (asterisk).

Numerical Data Example 1

Basic Lens Data

TABLE 1

| f = 1.70 mm Fno = 2.1 ω = 80.0° | | | | | [mm] |
|---|---|---|---|---|---|
| | i | r | d | n | ν |
| L1 | 1 | ∞ | ∞ | | |
| | 2* | 12.221 | 0.298 | 1.5371 | 59.7 f1 = −1.674 |
| | | 0.830 | 0.646 | (=D12) | |
| L2 | 3*(ST) | 1.213 | 0.581 | 1.5371 | 59.7 f2 = 2.561 |
| | 4* | 8.518 | 0.025 | | |

TABLE 1-continued

| | | f = 1.70 mm Fno = 2.1 ω = 80.0° | | | | |
|---|---|---|---|---|---|---|
| L3 | 5* | 1.812 | 0.438 | 1.5371 | 59.7 | f3 = 1.700 |
| | 6* | −1.685 | 0.154 | | | |
| L4 | 7* | −0.722 | 0.251 | 1.6689 | 21.9 | f4 = −2.905 |
| | 8* | −1.310 | 0.063 | | | |
| L5 | 9* | 1.434 | 0.702 | 1.5371 | 59.7 | f5 = 2.898 |
| | 10* | 15.023 | 0.313 | (=D56) | | |
| L6 | 11* | 16.176 | 0.250 | 1.6689 | 21.9 | f6 = −4.627 |
| | 12* | 2.582 | 0.100 | | | |
| | 13 | ∞ | 0.210 | 1.5187 | 64.0 | |
| | 14 | ∞ | 0.673 | | | |
| (IM) | | ∞ | | | | |

F1 = 3.529 mm
F2 = 4.934 mm
f23 = 1.192 mm
E4 = 0.457 mm
T4 = 0.251 mm
Φ1A = 2.800 mm
Φ4B = 1.724 mm
Φ5A = 2.447 mm
Φ6B = 3.383 mm
La = 4.632 mm
Hmax = 9.637 mm
Dep = 0.798 mm

TABLE 2

Aspherical surface data

| i | k | A4 | A6 | A8 | A10 | A12 | A14 | A16 |
|---|---|---|---|---|---|---|---|---|
| 2 | 0.000E+00 | −5.252E−03 | 1.215E−01 | 0.000E+00 | 0.000E+00 | 0.000E+00 | 0.000E+00 | 0.000E+00 |
| 3 | 0.000E+00 | −2.871E−03 | −6.052E−01 | 1.755E+00 | −1.187E+00 | −2.361E+01 | 6.852E+01 | −7.533E+01 |
| 4 | 0.000E+00 | −9.522E−01 | 2.337E+00 | −2.152E+00 | 1.037E+02 | −2.749E+02 | 3.747E+02 | −1.984E+02 |
| 5 | 0.000E+00 | −7.718E−01 | 1.770E+00 | −3.816E+00 | 1.024E+01 | −4.596E+01 | 1.337E+02 | −1.144E+02 |
| 6 | 0.000E+00 | 6.078E−02 | −5.855E−01 | −9.336E+00 | 4.081E+01 | −7.531E+01 | 7.480E+01 | −3.645E+01 |
| 7 | 0.000E+00 | 1.213E+00 | −1.795E+00 | −4.901E+00 | 4.060E+01 | −7.364E+01 | 3.978E+01 | 9.892E+00 |
| 8 | 0.000E+00 | 5.859E−01 | −1.512E+00 | 5.327E+00 | −7.236E+00 | 2.466E+00 | 2.060E+00 | −1.260E+00 |
| 9 | 0.000E+00 | −4.730E−01 | 6.591E−01 | −9.016E−01 | 8.889E−01 | −6.001E−01 | 2.276E−01 | −3.504E−02 |
| 10 | 0.000E+00 | 4.486E−02 | −2.796E−01 | 3.304E−01 | −2.729E−01 | 1.604E−01 | −6.263E−02 | 1.140E−02 |
| 11 | 0.000E+00 | −1.431E−01 | −6.148E−04 | −6.381E−01 | 1.178E+00 | −8.566E−01 | 2.926E−01 | −3.930E−02 |
| 12 | 0.000E+00 | −1.510E−01 | −1.209E−01 | 1.178E−01 | −2.128E−02 | −6.665E−03 | 2.763E−03 | −2.718E−04 |

The values of the respective conditional expressions are as follows:
D12/f=0.380
f2/f3=1.506
f23/f=0.701
f4/f=−1.709
Φ5A/Φ4B=1.419
|f5|/|f6|=0.626
f6/f=−2.722
D56/f=0.184
La/Hmax=0.481
f/Dep=2.130

Accordingly, the imaging lens of Numerical Data Example 1 satisfies the above-described conditional expressions.

Figure 2:
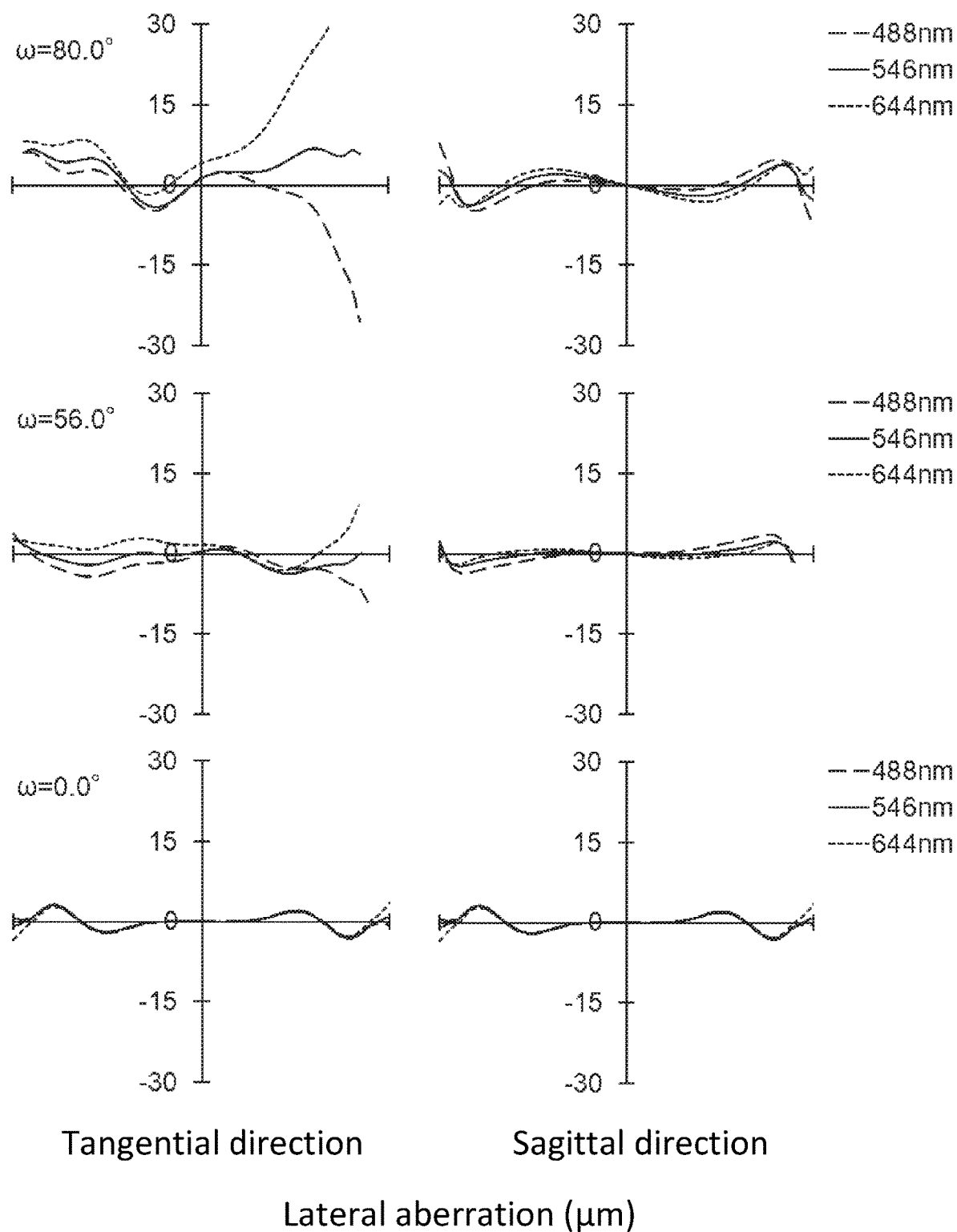
FIG. 2 is an aberration diagram showing a lateral aberration of the imaging lens of FIG. 1.
Figure 3:
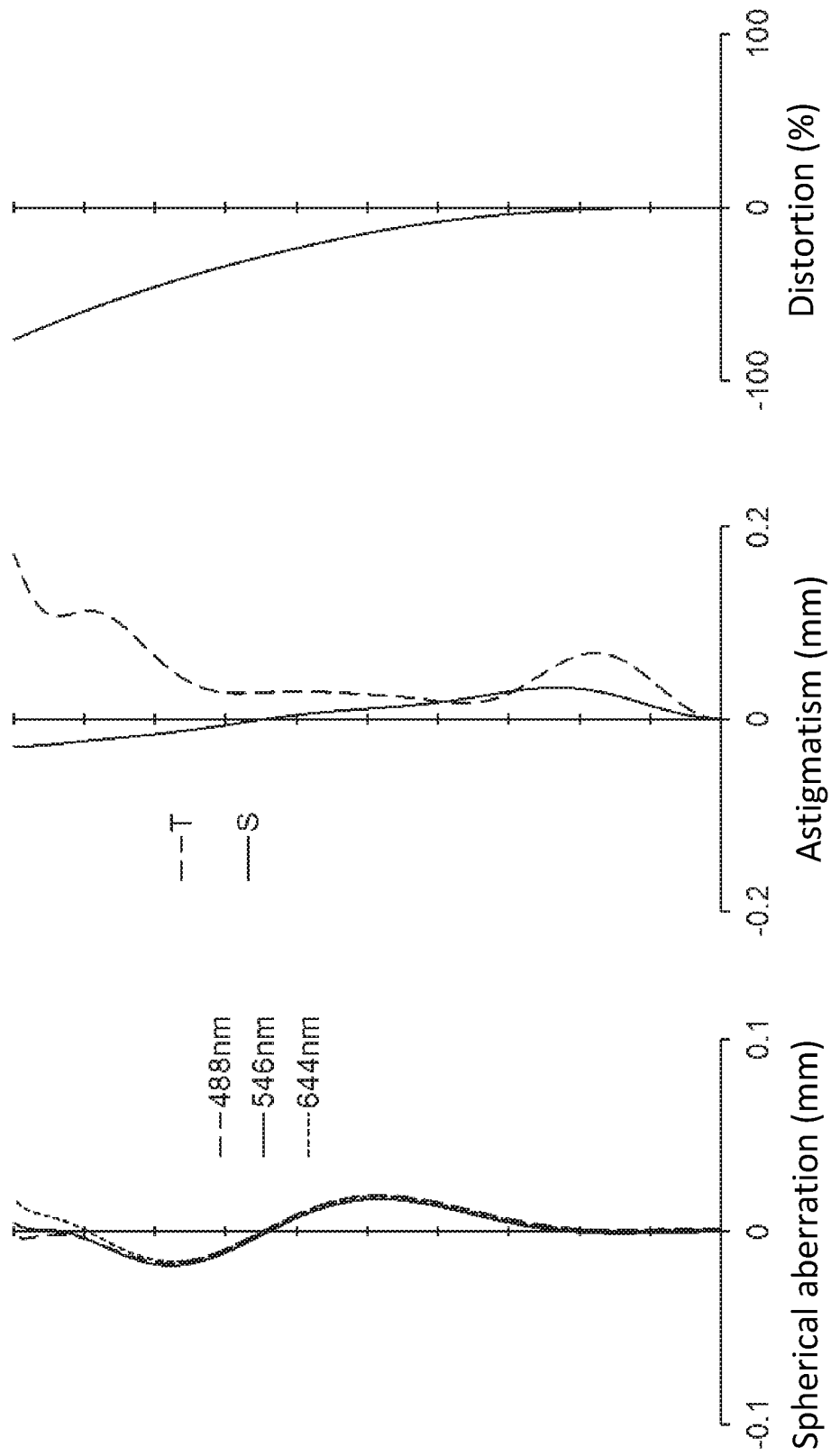
FIG. 3 is an aberration diagram showing a spherical aberration, astigmatism, and a distortion of the imaging lens of FIG. 1.
Figure 4:
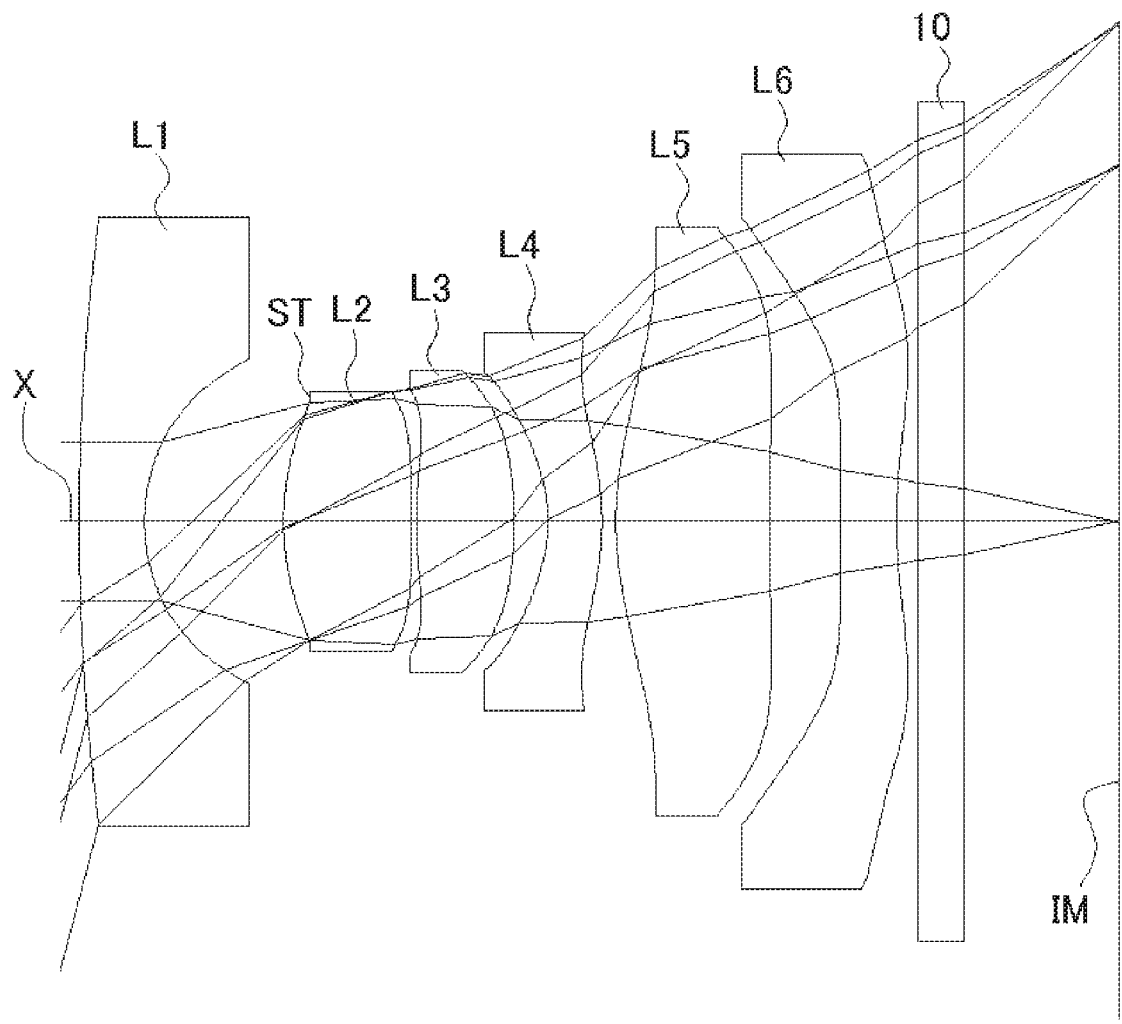
FIG. 4 is a sectional view of a schematic configuration of an imaging lens in Numerical Data Example 2 of the present invention.

FIG. 2 shows a lateral aberration that corresponds to a half angle of view ω, which is divided into a tangential direction and a sagittal direction (The same is true for FIGS. 5, 8, 11, 14, 17, and 20). Furthermore, FIG. 3 shows a spherical aberration (mm), astigmatism (mm), and a distortion (%), respectively. In the astigmatism diagram, an aberration on a sagittal image surface S and an aberration on a tangential image surface T are respectively indicated (The same is true for FIGS. 6, 9, 12, 15, 18, and 21). As shown in FIGS. 2 and 3, according to the imaging lens of Numerical Data Example 1, the aberrations are satisfactorily corrected.

Numerical Data Example 2

Basic Lens Data

TABLE 3

| | | f = 1.78 mm Fno = 2.2 ω = 75.0° | | | | |
|---|---|---|---|---|---|---|
| | i | r | d | n | ν | [mm] |
| | | ∞ | ∞ | | | |
| L1 | 1 | 10.662 | 0.300 | 1.5371 | 59.7 | f1 = −1.700 |
| | 2* | 0.833 | 0.640 | (=D12) | | |
| L2 | 3*(ST) | 1.217 | 0.584 | 1.5371 | 59.7 | f2 = 2.572 |
| | 4* | 8.528 | 0.027 | | | |
| L3 | 5* | 1.824 | 0.452 | 1.5371 | 59.7 | f3 = 1.713 |
| | 6* | −1.696 | 0.154 | | | |
| L4 | 7* | −0.720 | 0.248 | 1.6689 | 21.9 | f4 = −2.837 |
| | 8* | −1.319 | 0.064 | | | |
| L5 | 9* | 1.444 | 0.707 | 1.5371 | 59.7 | f5 = 2.972 |
| | 10* | 12.529 | 0.324 | (=D56) | | |

TABLE 3-continued

| | | f = 1.78 mm Fno = 2.2 ω = 75.0° | | | | |
|---|---|---|---|---|---|---|
| L6 | 11* | 16.516 | 0.260 | 1.6689 | 21.9 | f6 = −4.610 |
| | 12* | 2.582 | 0.100 | | | |
| | 13 | ∞ | 0.210 | 1.5187 | 64.0 | |
| | 14 | ∞ | 0.711 | | | |
| (IM) | | ∞ | | | | |

F1 = 3.707 mm
F2 = 5.156 mm
f23 = 1.201 mm
E4 = 0.458 mm
T4 = 0.248 mm
Φ1A = 2.800 mm
Φ4B = 1.735 mm
Φ5A = 2.423 mm
Φ6B = 3.392 mm
La = 4.710 mm
Hmax = 6.643 mm
Dep = 0.805 mm

TABLE 4

Aspherical surface data

| i | k | A4 | A6 | A8 | A10 | A12 | A14 | A16 |
|---|---|---|---|---|---|---|---|---|
| 2 | 0.000E+00 | −5.445E−03 | 1.413E−01 | 0.000E+00 | 0.000E+00 | 0.000E−00 | 0.000E+00 | 0.000E+00 |
| 3 | 0.000E+00 | −2.794E−03 | −6.044E−01 | 1.754E+00 | −1.199E+00 | −2.366E+01 | 6.838E+01 | −7.621E+01 |
| 4 | 0.000E+00 | −9.542E−01 | 2.330E+00 | −2.155E+01 | 1.036E+02 | −2.750E+02 | 3.748E+02 | −1.979E+02 |
| 5 | 0.000E+00 | −7.697E−01 | 1.766E+00 | −3.815E+00 | 1.025E+01 | −4.592E+01 | 1.337E+02 | −1.147E+02 |
| 6 | 0.000E+00 | 5.873E−02 | −5.882E+00 | −9.332E+00 | 4.082E+01 | −7.532E+01 | 7.478E+01 | −3.646E+01 |
| 7 | 0.000E+00 | 1.217E+00 | −1.803E+00 | −4.944E+00 | 4.057E+01 | −7.357E+01 | 3.988E+01 | 1.084E+01 |
| 8 | 0.000E+00 | 5.824E−01 | −1.515E+00 | 5.324E−00 | −7.240E+00 | 2.458E+00 | 2.056E+00 | −1.254E+00 |
| 9 | 0.000E+00 | −4.719E−01 | 6.593E−01 | −9.017E−01 | 8.890E−01 | −6.001E−01 | 2.277E−01 | −3.499E−02 |
| 10 | 0.000E+00 | 4.270E−02 | −2.795E−01 | 3.304E−01 | −2.730E−01 | 1.604E−01 | −6.260E−02 | 1.140E−02 |
| 11 | 0.000E+00 | −1.405E−01 | −8.819E−04 | −6.381E 01 | 1.178E+00 | −8.568E−01 | 2.925E−01 | −3.925E−02 |
| 12 | 0.000E+00 | −1.507E−01 | −1.208E−01 | 1.178E−01 | −2.128E−02 | −6.664E−03 | 2.763E−03 | −2.717E−04 |

The values of the respective conditional expressions are as follows:
D12/f=0.360
f2/f3=1.501
f23/f=0.675
f4/f=−1.594
Φ5A/Φ4B=1.397
|f5|/|f6|=0.645
f6/f=−2.590
D56/f=0.182
La/Hmax=0.709
f/Dep=2.211

Accordingly, the imaging lens of Numerical Data Example 2 satisfies the above-described conditional expressions.

Figure 5:
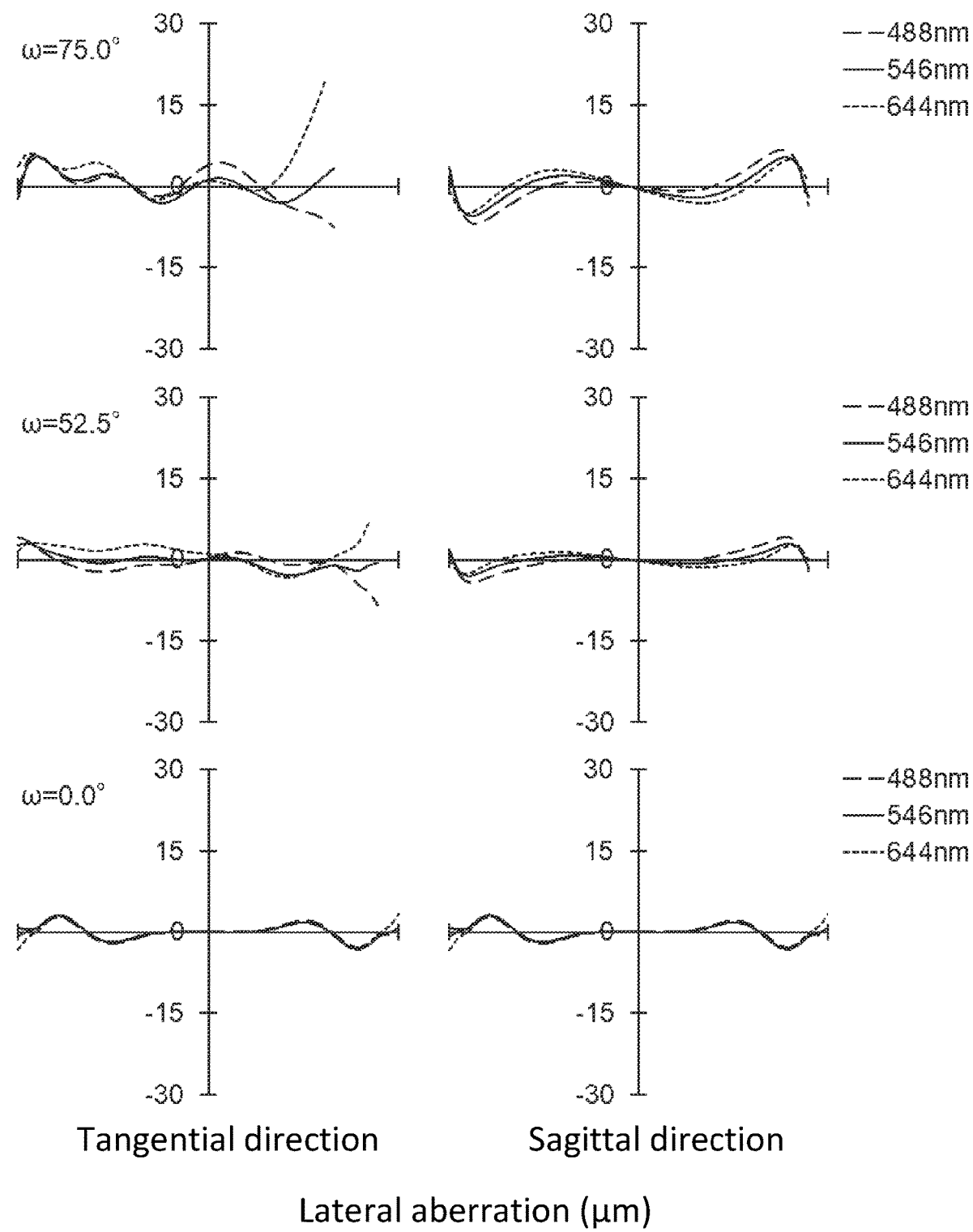
FIG. 5 is an aberration diagram showing a lateral aberration of the imaging lens of FIG. 4.
Figure 6:
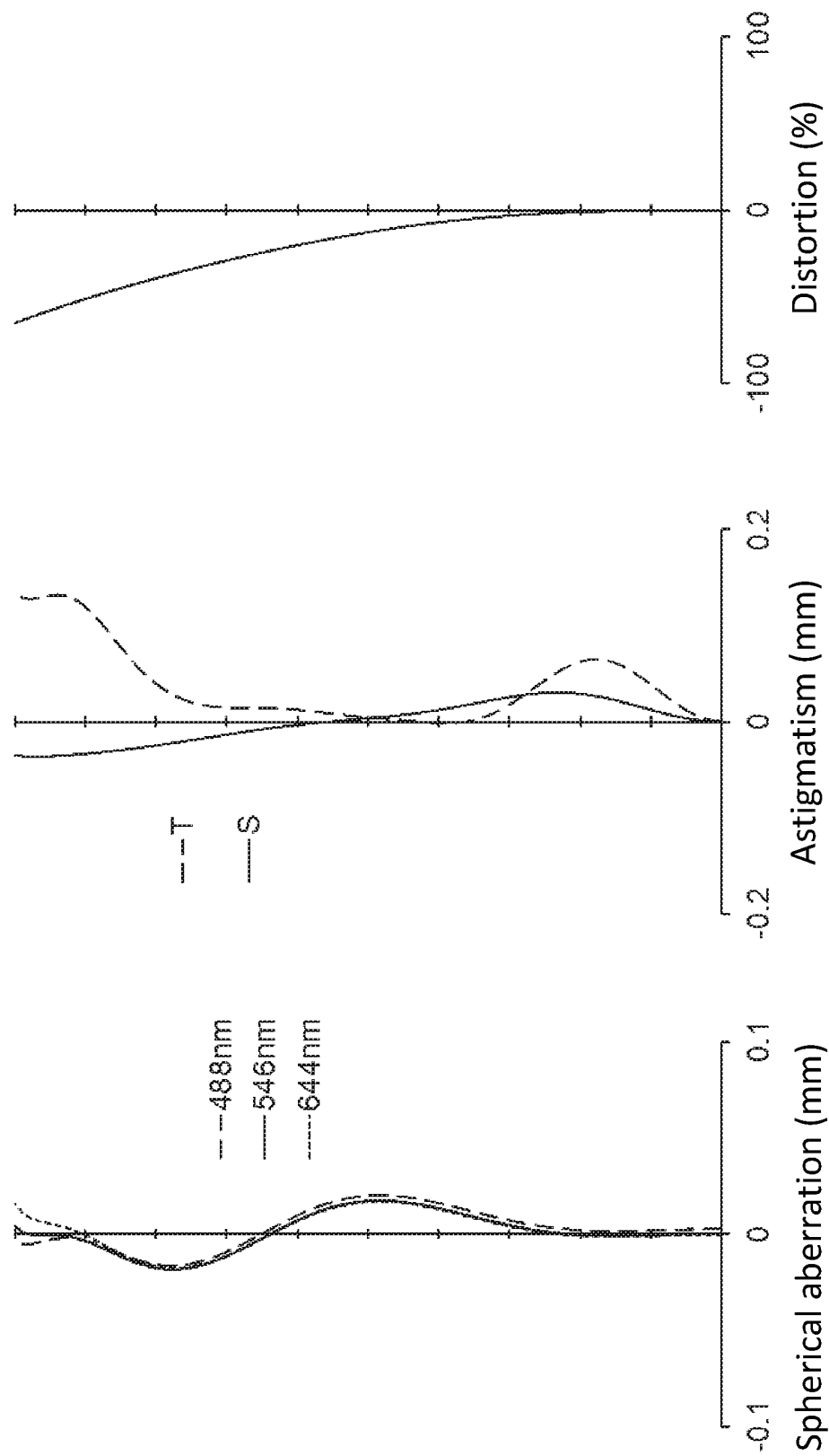
FIG. 6 is an aberration diagram showing a spherical aberration, astigmatism, and a distortion of the imaging lens of FIG. 4.
Figure 7:
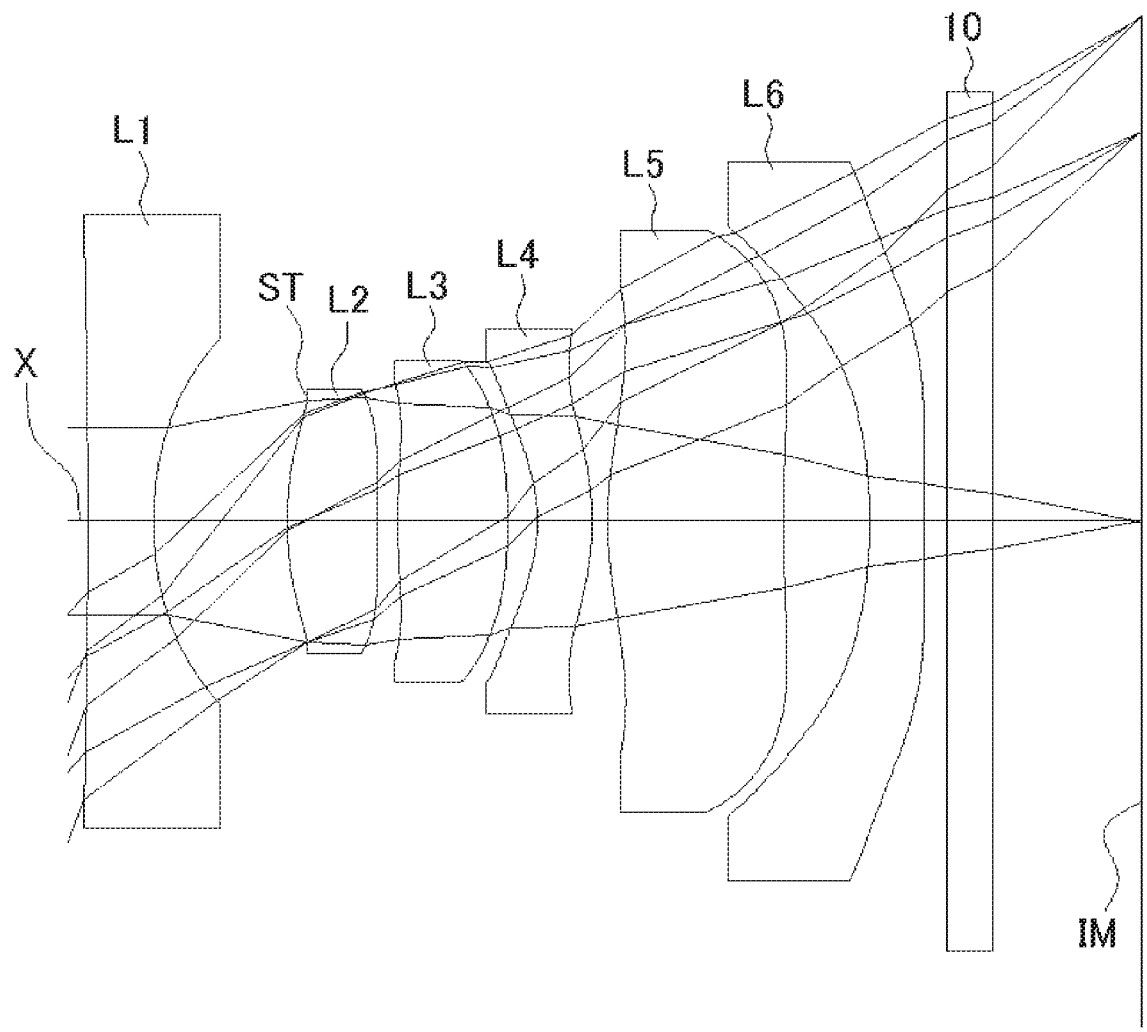
FIG. 7 is a sectional view of a schematic configuration of an imaging lens in Numerical Data Example 3 of the present invention.

FIG. 5 shows a lateral aberration that corresponds to a half angle of view ω, and FIG. 6 shows a spherical aberration (mm), astigmatism (mm), and a distortion (%), respectively. As shown in FIGS. 5 and 6, according to the imaging lens of Numerical Data Example 2, the aberrations are satisfactorily corrected.

Numerical Data Example 3

Basic Lens Data

TABLE 5 f = 2.24 mm Fno = 2.5 ω = 70.0°

| | i | r | d | n | ν | [mm] |
|---|---|---|---|---|---|---|
| L1 | 1 | ∞ | ∞ | | | |
| | 2* | −49.297 | 0.300 | 1.5371 | 59.7 | f1 = −2.644 |
| | | 1.465 | 0.607 | | | (=D12) |

TABLE 5-continued f = 2.24 mm Fno = 2.5 ω = 70.0°

| | i | r | d | n | ν | [mm] |
|---|---|---|---|---|---|---|
| L2 | 3*(ST) | 1.418 | 0.414 | 1.5371 | 59.7 | f2 = 2.639 |
| | 4* | −6370.236 | 0.089 | | | |
| L3 | 5* | 2.777 | 0.503 | 1.5371 | 59.7 | f3 = 2.373 |
| | 6* | −2.207 | 0.135 | | | |
| L4 | 7* | −0.768 | 0.250 | 1.6689 | 21.9 | f4 = −4.196 |
| | 8* | −1.196 | 0.069 | | | |
| L5 | 9* | 1.607 | 0.800 | 1.5371 | 59.7 | f5 = 3.775 |
| | 10* | 6.406 | 0.393 | (=D56) | | |
| L6 | 11* | −2.389 | 0.250 | 1.6689 | 21.9 | f6 = −3.443 |
| | 12* | 66.439 | 0.100 | | | |
| | 13 | ∞ | 0.210 | 1.5187 | 64.0 | |
| | 14 | ∞ | 0.680 | | | |
| (IM) | | ∞ | | | | |

F1 = 3.379 mm
F2 = 17.974 mm
f23 = 1.403 mm
E4 = 0.396 mm
T4 = 0.250 mm
Φ1A = 2.800 mm
Φ4B = 1.748 mm
Φ5A = 2.175 mm
Φ6B = 3.275 mm
La = 4.728 mm
Hmax = 6.161 mm
Dep = 0.893 mm

TABLE 6

Aspherical surface data

| i | k | A4 | A6 | A8 | A10 | A12 | A14 | A16 |
|---|---|---|---|---|---|---|---|---|
| 2 | 0.000E+00 | 5.769E−02 | 4.646E−02 | 0.000E+00 | 0.000E+00 | 0.000E+00 | 0.000E+00 | 0.000E+00 |
| 3 | 0.000E+00 | −5.233E−02 | −5.618E−01 | 8.533E−01 | 1.939E+00 | −3.127E+01 | 6.926E+01 | −5.267E+01 |
| 4 | 0.000E+00 | −5.136E−01 | 1.837E+00 | −2.088E+01 | 1.021E+02 | −2.801E+02 | 4.072E+02 | −2 444E+02 |
| 5 | 0.000E+00 | −4.026E−01 | −1.264E−02 | −4.765E+00 | 1.871E+01 | −4.553E+01 | 9.708E+01 | −9.087E+01 |
| 6 | 0.000E+00 | −3.634E−02 | −3.265E−01 | −9.420E+00 | 4.433E+01 | −7.675E+01 | 5.807E+01 | −1.851E+01 |
| 7 | 0.000E+00 | 1.295E+00 | −2.197E+00 | −2.046E+00 | 3.592E+01 | −7.938E+01 | 6.239E+01 | −9.123E+00 |
| 8 | 0.000E+00 | 5.238E−01 | −1.136E+00 | 4.521E+00 | −6.037E+00 | 2.239E+00 | 7.784E−01 | −3.745E−01 |
| 9 | 0.000E+00 | −5.497E−01 | 7.072E−01 | −8.989E−01 | 8.315E−01 | −5.765E−01 | 2.508E−01 | −4.347E−02 |
| 10 | 0.000E+00 | −1.946E−02 | −2.460E−01 | 3.108E−01 | −2.742E−01 | 1.641E−01 | −6.299E−02 | 1.067E−02 |
| 11 | 0.000E+00 | −2.604E−02 | −3.151E−03 | −6.334E−01 | 1.167E+00 | −8.580E−01 | 2.932E−01 | −3.900E−02 |
| 12 | 0.000E+00 | −5.498E−02 | −1.354E−01 | 1.161E−01 | −2 124E−02 | −6.683E−03 | 2.760E−03 | −2.538E−04 |

The values of the respective conditional expressions are as follows:
D12/f=0.271
f2/f3=1.112
f23/f=0.626
f4/f=−1.873
Φ5A/Φ4B=1.244
|f5|/|f6|=1.096 f6/f=−1.537
D56/f=0.175
La/Hmax=0.767
f/Dep=2.508

Accordingly, the imaging lens of Numerical Data Example 3 satisfies the above-described conditional expressions.

Figure 8:
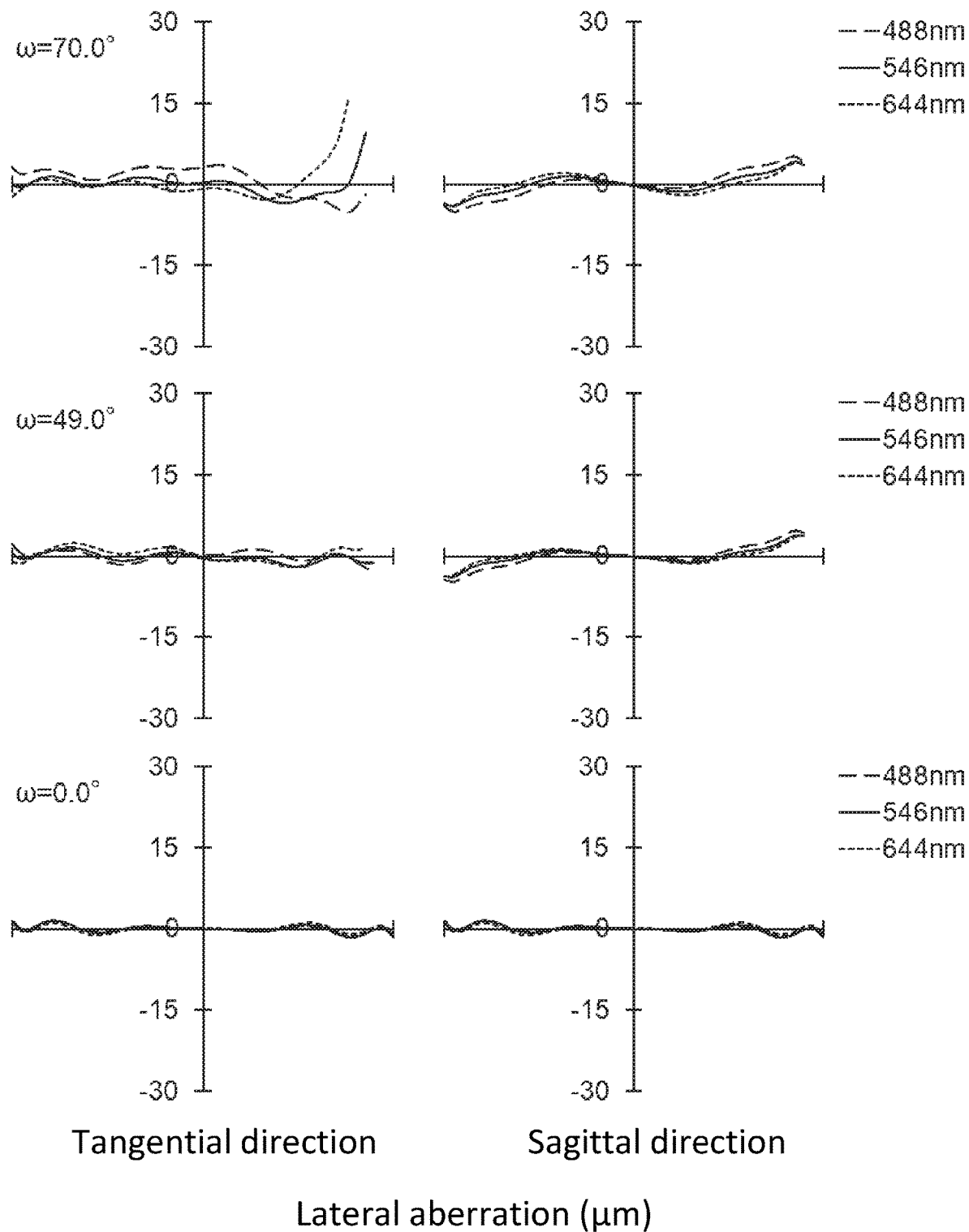
FIG. 8 is an aberration diagram showing a lateral aberration of the imaging lens of FIG. 7.
Figure 9:
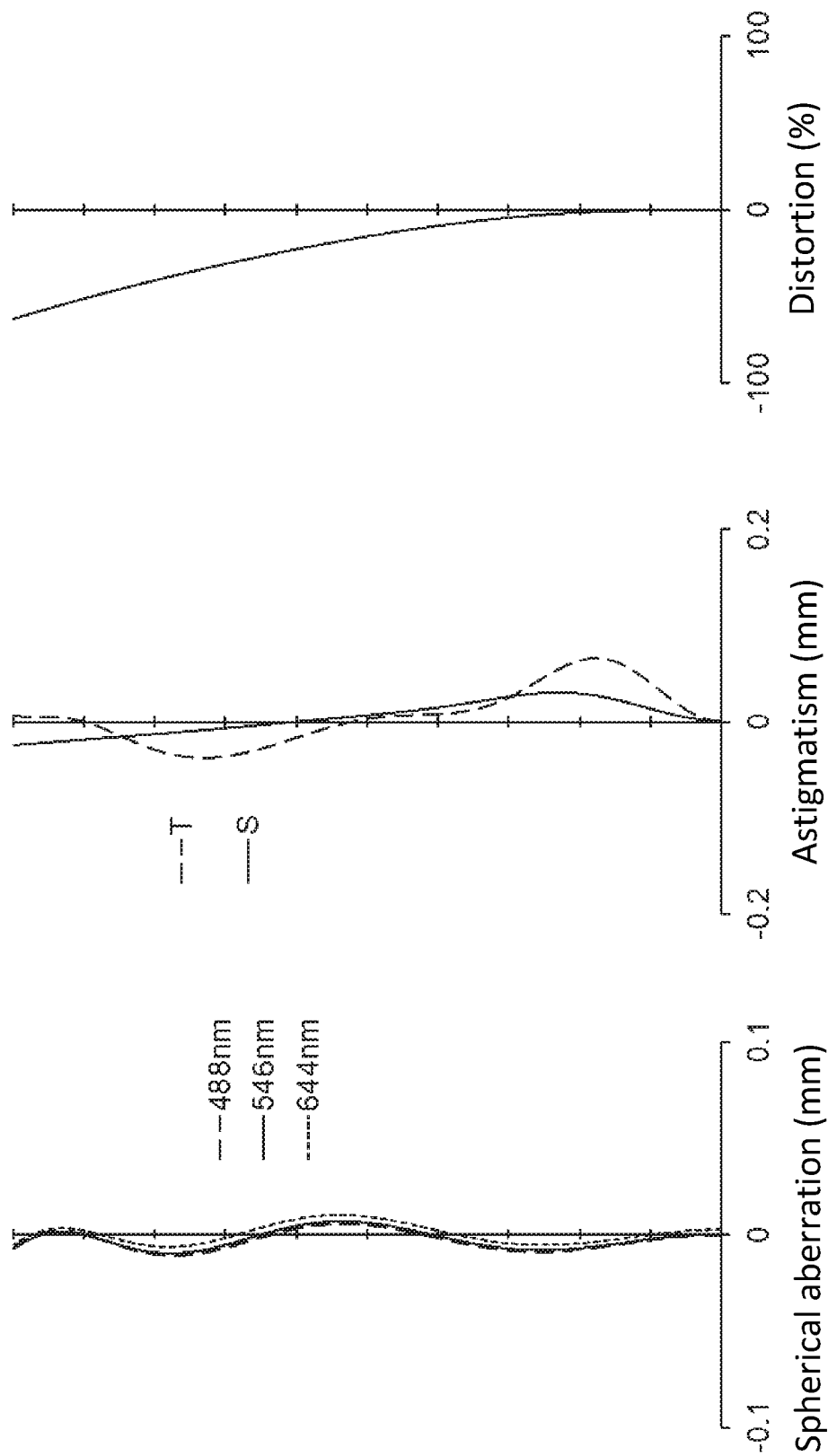
FIG. 9 is an aberration diagram showing a spherical aberration, astigmatism, and a distortion of the imaging lens of FIG. 7.
Figure 10:
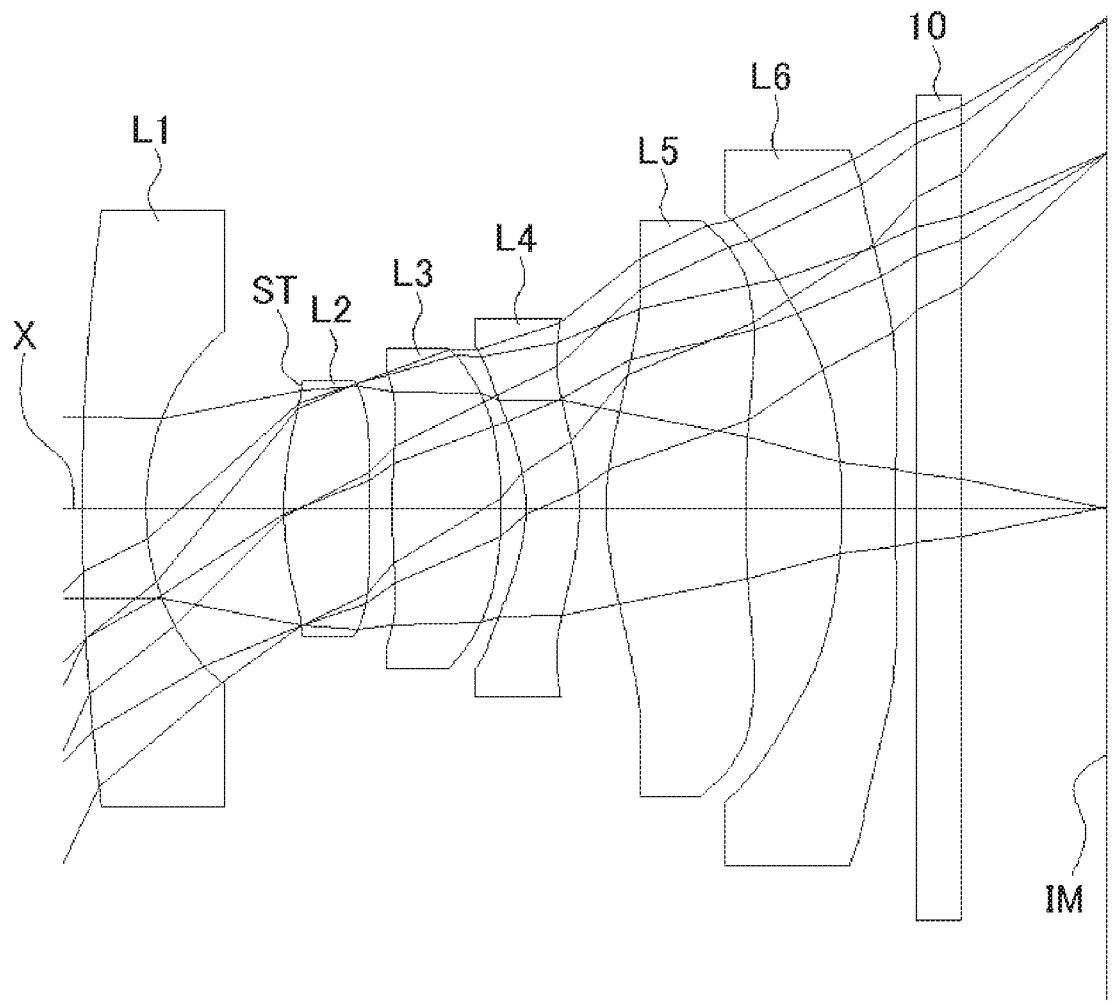
FIG. 10 is a sectional view of a schematic configuration of an imaging lens in Numerical Data Example 4 of the present invention.

FIG. 8 shows a lateral aberration that corresponds to a half angle of view ω, and FIG. 9 shows a spherical aberration (mm), astigmatism (mm), and a distortion (%), respectively. As shown in FIGS. 8 and 9, according to the imaging lens of Numerical Data Example 3, the aberrations are satisfactorily corrected.

Numerical Data Example 4

Basic Lens Data

TABLE 7 f = 2.15 mm Fno = 2.4 ω = 65.0°

|  | i | r | d | n | ν | [mm] |
|---|---|---|---|---|---|---|
|  |  | ∞ | ∞ |  |  |  |
| L1 | 1 | 10.662 | 0.300 | 1.5371 | 59.7 | f1 = −2.655 |
|  | 2* | 1.245 | 0.645 | (=D12) |  |  |
| L2 | 3*(ST) | 1.513 | 0.402 | 1.5371 | 59.7 | f2 = 2.818 |
|  | 4* | 3795.979 | 0.105 |  |  |  |
| L3 | 5* | 3.302 | 0.511 | 1.5371 | 59.7 | f3 = 2.333 |
|  | 6* | −1.910 | 0.115 |  |  |  |
| L4 | 7* | −0.801 | 0.250 | 1.6689 | 21.9 | f4 = −4.133 |
|  | 8* | −1.269 | 0.127 |  |  |  |
| L5 | 9* | 1.345 | 0.651 | 1.5371 | 59.7 | f5 = 3.277 |
|  | 10* | 4.734 | 0.454 | (=D56) |  |  |
| L6 | 11* | −2.560 | 0.250 | 1.6689 | 21.9 | f6 = −3.272 |
|  | 12* | 15.679 | 0.100 |  |  |  |
|  | 13 | ∞ | 0.210 | 1.5187 | 64.0 |  |
|  | 14 | ∞ | 0.680 |  |  |  |
| (IM) |  | ∞ |  |  |  |  |

F1 = 3.667 mm
F2 = 10.467 mm
f23 = 1.440 mm
E4 = 0.398 mm
T4 = 0.250 mm
Φ1A = 2.800 mm
Φ4B = 1.775 mm
Φ5A = 2.411 mm
Φ6B = 3.361 mm

TABLE 7-continued f = 2.15 mm Fno = 2.4 ω = 65.0°

La = 4.728 mm
Hmax = 4.624 mm
Dep = 0.892 mm

TABLE 8

Aspherical surface data

| i | k | A4 | A6 | A8 | A10 | A12 | A14 | A16 |
|---|---|---|---|---|---|---|---|---|
| 2 | 0.000E+00 | 4.995E−02 | 7.612E−02 | 0.000E+00 | 0.000E+00 | 0.000E+00 | 0.000E+00 | 0.000E+00 |
| 3 | 0.000E+00 | −7.207E−02 | −4.636E−01 | 6.284E−02 | 4.467E+00 | −3.043E+01 | 4.256E+01 | −7.394E+00 |
| 4 | 0.000E+00 | −4.129E−01 | 1.549E+00 | −2.079E+01 | 1.028E+02 | −2.785E+02 | 3.904E+02 | −2.179E+02 |
| 5 | 0.000E+00 | −3.073E−01 | 1.722E−02 | −5.633E+00 | 2.009E+01 | −4.694E+01 | 8.974E+01 | −7.393E+01 |
| 6 | 0.000E+00 | 7.238E−02 | −5.674E−01 | −8.992E+00 | 4.318E+01 | −7.769E+01 | 6.212E+01 | −1.927E+01 |
| 7 | 0.000E+00 | 1.203E+00 | −2.133E+00 | −1.164E+00 | 3.120E+01 | −7.705E+01 | 7.577E+01 | −2.609E+01 |
| 8 | 0.000E+00 | 4.016E−01 | −7.821E−01 | 3.902E+00 | −5.688E+00 | 2.349E+00 | 8.307E−01 | −5.869E−01 |
| 9 | 0.000E+00 | −5.109E−01 | 6.272E−01 | −8.338E−01 | 8.052E−01 | −5.727E−01 | 2.447E−01 | −4.493E−02 |
| 10 | 0.000E+00 | 2.898E−02 | −2.961E−01 | 3.644E−01 | −2.846E−01 | 1.550E−01 | −6.240E−02 | 1.222E−02 |
| 11 | 0.000E+00 | 1.778E−02 | 8.389E−03 | −6.423E−01 | 1.168E+00 | −8.596E−01 | 2.921E−01 | −3.818E−02 |
| 12 | 0.000E+00 | −2.472E−02 | −1.390E−01 | 1.126E−01 | −2.113E−02 | −6.367E−03 | 2.826E−03 | −2.879E−04 |

The values of the respective conditional expressions are as follows:
D12/f=0.300
f2/f3=1.208
f23/f=0.670
f4/f=−1.922
Φ5A/Φ4B=1.358
|f5|/|f6|=1.002
f6/f=−1.522
D56/f=0.211
La/Hmax=1.022
f/Dep=2.410

Accordingly, the imaging lens of Numerical Data Example 4 satisfies the above-described conditional expressions.

Figure 11:
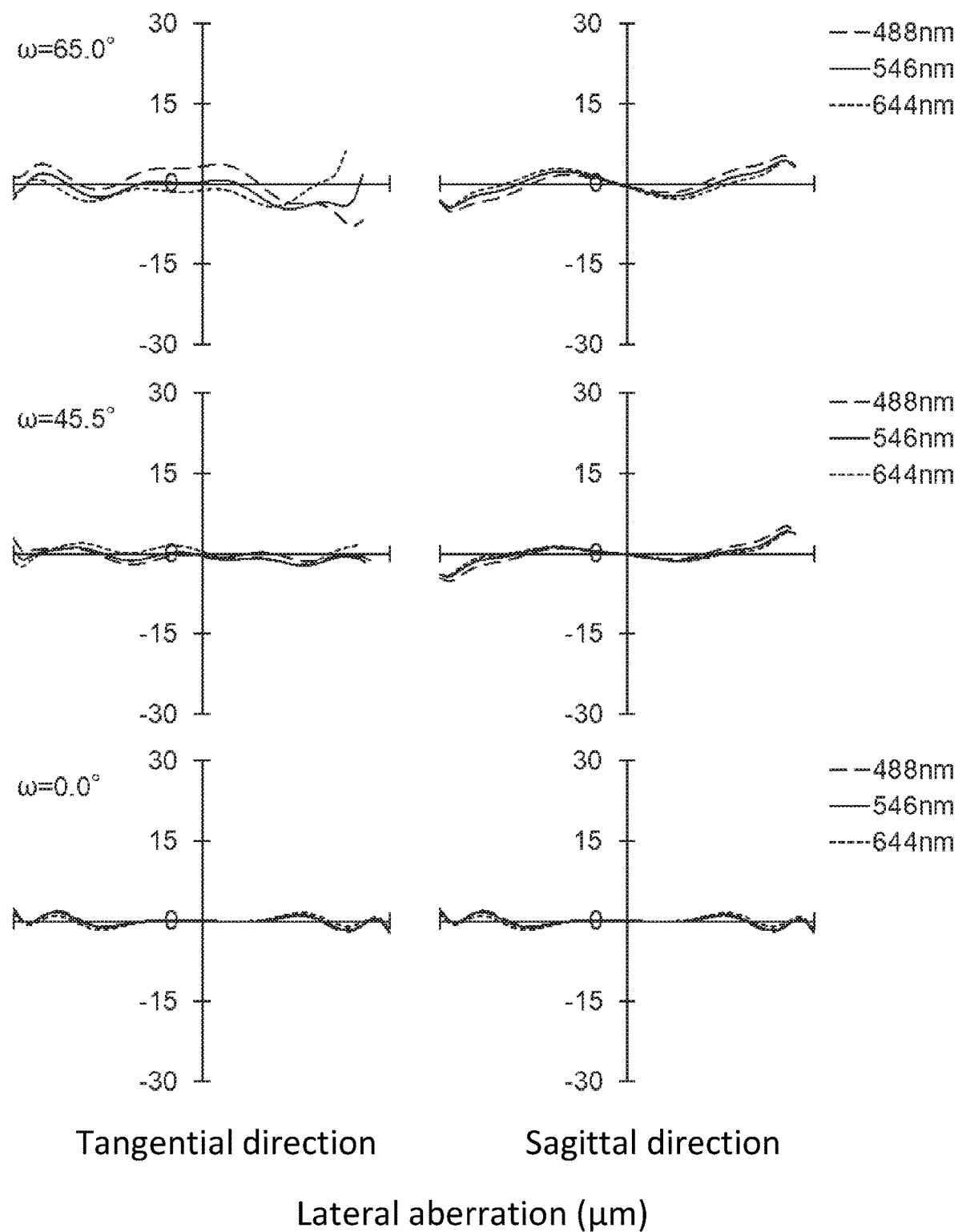
FIG. 11 is an aberration diagram showing a lateral aberration of the imaging lens of FIG. 10.
Figure 12:
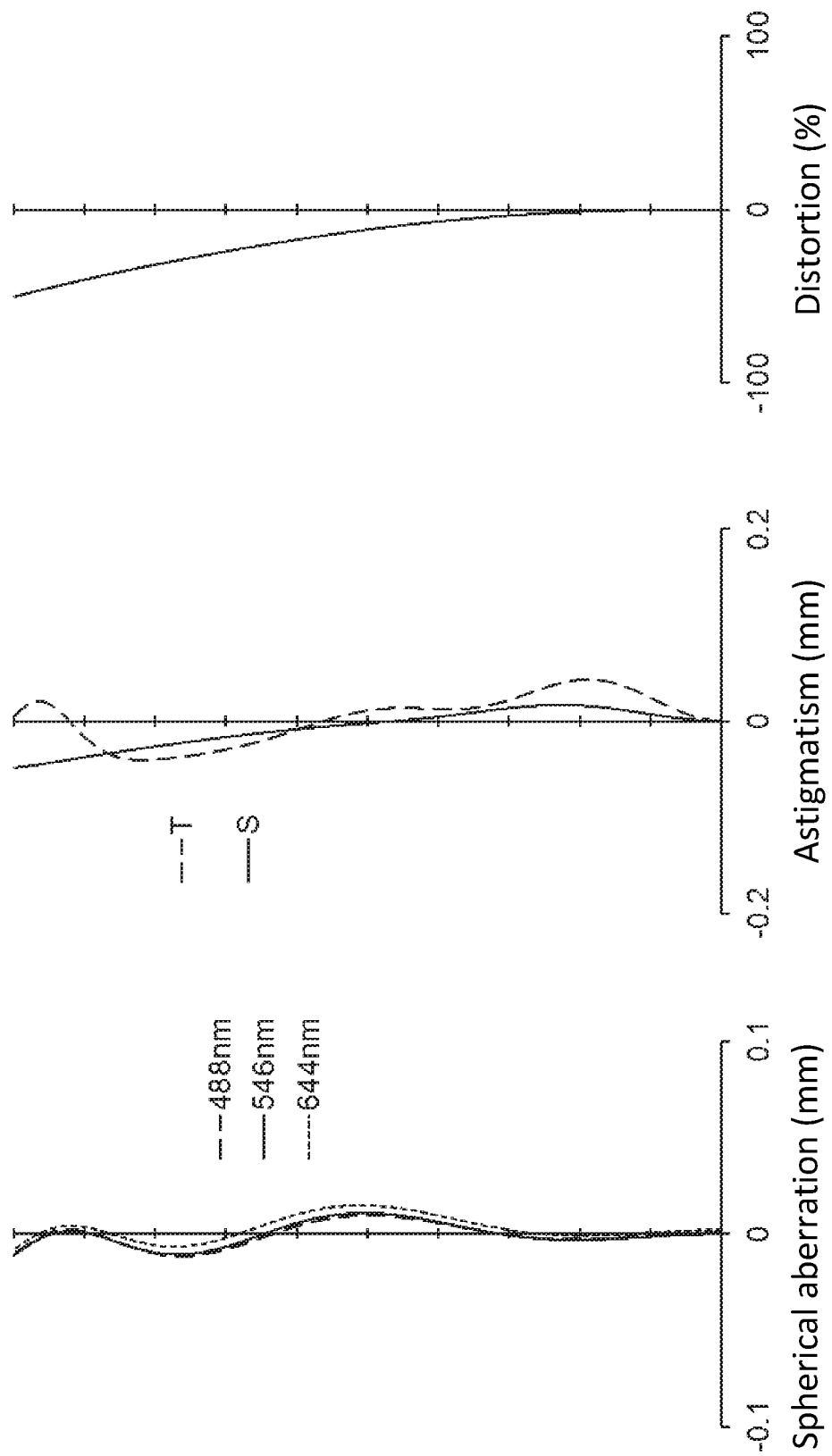
FIG. 12 is an aberration diagram showing a spherical aberration, astigmatism, and a distortion of the imaging lens of FIG. 10.
Figure 13:
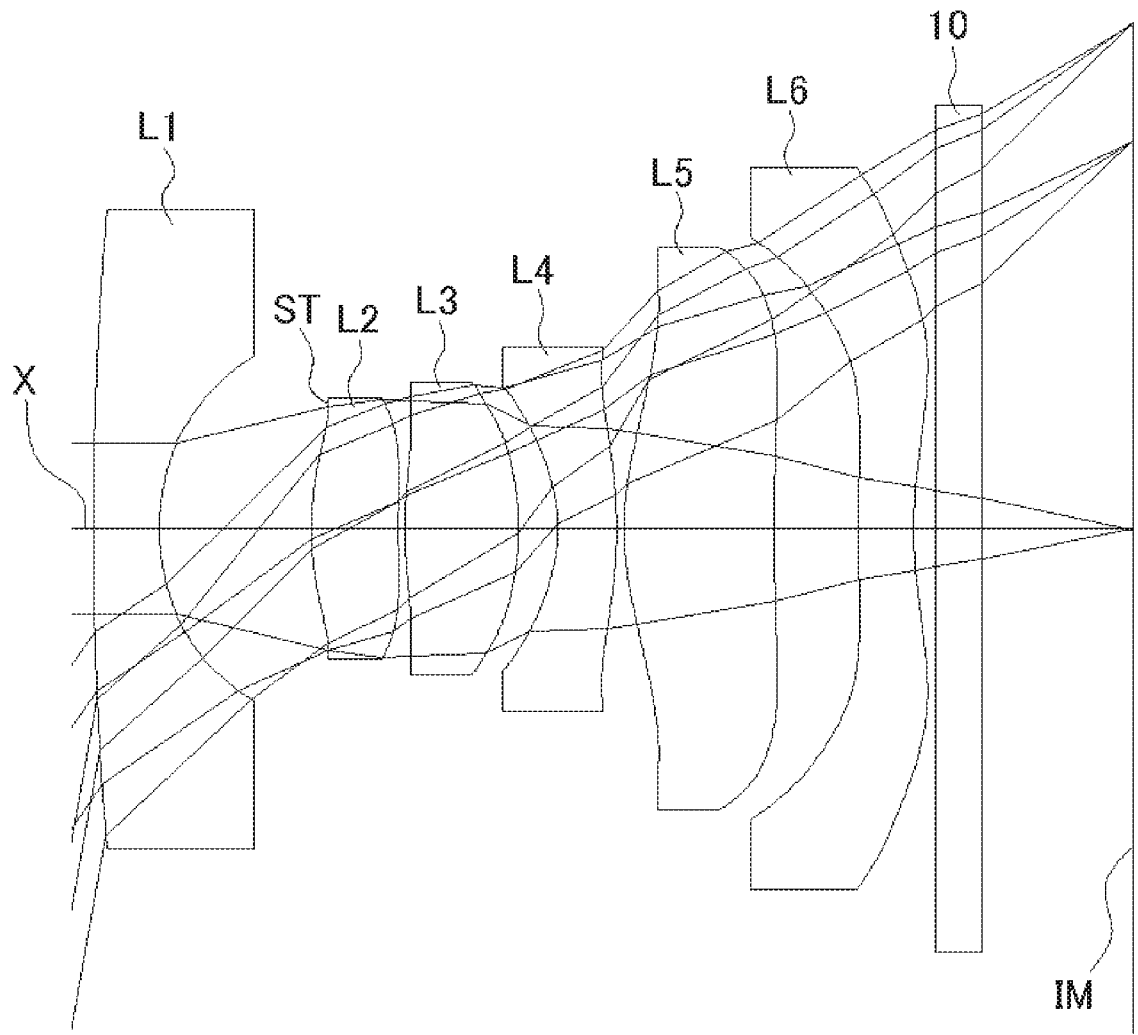
FIG. 13 is a sectional view of a schematic configuration of an imaging lens in Numerical Data Example 5 of the present invention.

FIG. 11 shows a lateral aberration that corresponds to a half angle of view ω, and FIG. 12 shows a spherical aberration (mm), astigmatism (mm), and a distortion (%), respectively. As shown in FIGS. 11 and 12, according to the imaging lens of Numerical Data Example 4, the aberrations are satisfactorily corrected.

Numerical Data Example 5

Basic Lens Data

TABLE 9 f = 1.87 mm Fno = 2.3 ω = 80.0°

|  | i | r | d | n | ν | [mm] |
|---|---|---|---|---|---|---|
|  |  | ∞ | ∞ |  |  |  |
| L1 | 1 | 16.899 | 0.299 | 1.5371 | 59.7 | f1 = −2.013 |
|  | 2* | 1.010 | 0.687 | (=D12) |  |  |
| L2 | 3*(ST) | 1.399 | 0.393 | 1.5371 | 59.7 | f2 = 3.349 |
|  | 4* | 5.671 | 0.029 |  |  |  |
| L3 | 5* | 1.840 | 0.516 | 1.5371 | 59.7 | f3 = 1.489 |
|  | 6* | −1.275 | 0.177 |  |  |  |
| L4 | 7* | −0.708 | 0.266 | 1.6689 | 21.9 | f4 = −1.891 |
|  | 8* | −1.851 | 0.032 |  |  |  |
| L5 | 9* | 1.241 | 0.681 | 1.5371 | 59.7 | f5 = 2.445 |
|  | 10* | 18.312 | 0.381 | (=D56) |  |  |
| L6 | 11* | 8.642 | 0.250 | 1.6689 | 21.9 | f6 = −4.468 |
|  | 12* | 2.195 | 0.100 |  |  |  |

TABLE 9-continued

| f = 1.87 mm Fno = 2.3 ω = 80.0° | | | | | |
|---|---|---|---|---|---|
| 13 | ∞ | 0.210 | 1.5187 | 64.0 | |
| 14 | ∞ | 0.681 | | | |
| (IM) | ∞ | | | | |

F1 = 5.724 mm
F2 = 3.550 mm
f23 = 1.168 mm
E4 = 0.459 mm
T4 = 0.266 mm
Φ1A = 2.900 mm
Φ4B = 1.650 mm
Φ5A = 2.200 mm
Φ6B = 3.270 mm
La = 4.630 mm
Hmax = 10.605 mm
Dep = 0.824 mm

TABLE 10

Aspherical surface data

| i | k | A4 | A6 | A8 | A10 | A12 | A14 | A16 |
|---|---|---|---|---|---|---|---|---|
| 2 | 0.000E+00 | 4.653E−02 | 1.475E−01 | 0.000E+00 | 0.000E+00 | 0.000E+00 | 0.000E+00 | 0.000E+00 |
| 3 | 0.000E+00 | −1.172E−01 | −4.719E−01 | −1.271E+00 | 7.252E+00 | −4.716E+01 | 8.297E+01 | −4.233E+01 |
| 4 | 0.000E+00 | −8.475E−01 | 1.157E+00 | −1.704E+01 | 9.422E+01 | −2.784E+02 | 4.484E+02 | −2.976E+02 |
| 5 | 0.000E+00 | −6.486E−01 | 2.962E−01 | −5.342E+00 | 2.177E+01 | −3.851E+01 | 9.067E+01 | −1.134E+02 |
| 6 | 0.000E+00 | 1.590E−01 | −9.603E−01 | −4.531E+00 | 3.294E+01 | −8.910E+01 | 1.311E+02 | −8.574E+01 |
| 7 | 0.000E+00 | 1.607E+00 | −4.070E+00 | 6.307E−01 | 3.769E+01 | −7.785E+01 | 2.464E+01 | 4.828E+01 |
| 8 | 0.000E+00 | 6.198E−01 | −2.333E+00 | 5.917E+00 | −6.294E+00 | 1.836E+00 | 9.901E−01 | −4.126E−01 |
| 9 | 0.000E+00 | −6.163E−01 | 7.513E−01 | −9.830E−01 | 9.071E−01 | −6.065E−01 | 2.484E−01 | −4.920E−02 |
| 10 | 0.000E+00 | 1.140E−01 | −3.734E−01 | 3.935E−01 | −2.863E−01 | 1.449E−01 | −5.654E−02 | 1.106E−02 |
| 11 | 0.000E+00 | −1.556E−01 | 1.694E−02 | −6.489E−01 | 1.182E+00 | −8.595E−01 | 2.847E−01 | −3.569E−02 |
| 12 | 0.000E+00 | −1.967E−01 | −9.924E−02 | 1.109E−01 | −2.341E−02 | −5.393E−03 | 2.647E−03 | −2.682E−04 |

The values of the respective conditional expressions are as follows:

D12/f=0.367 f2/f3=2.249 f23/f=0.625 f4/f=−1.011

Φ5A/Φ4B=1.333

|f5|/|f6|=0.547 f6/f=−2.389

D56/f=0.204

La/Hmax=0.437 f/Dep=2.269

Accordingly, the imaging lens of Numerical Data Example 5 satisfies the above-described conditional expressions.

Figure 14:
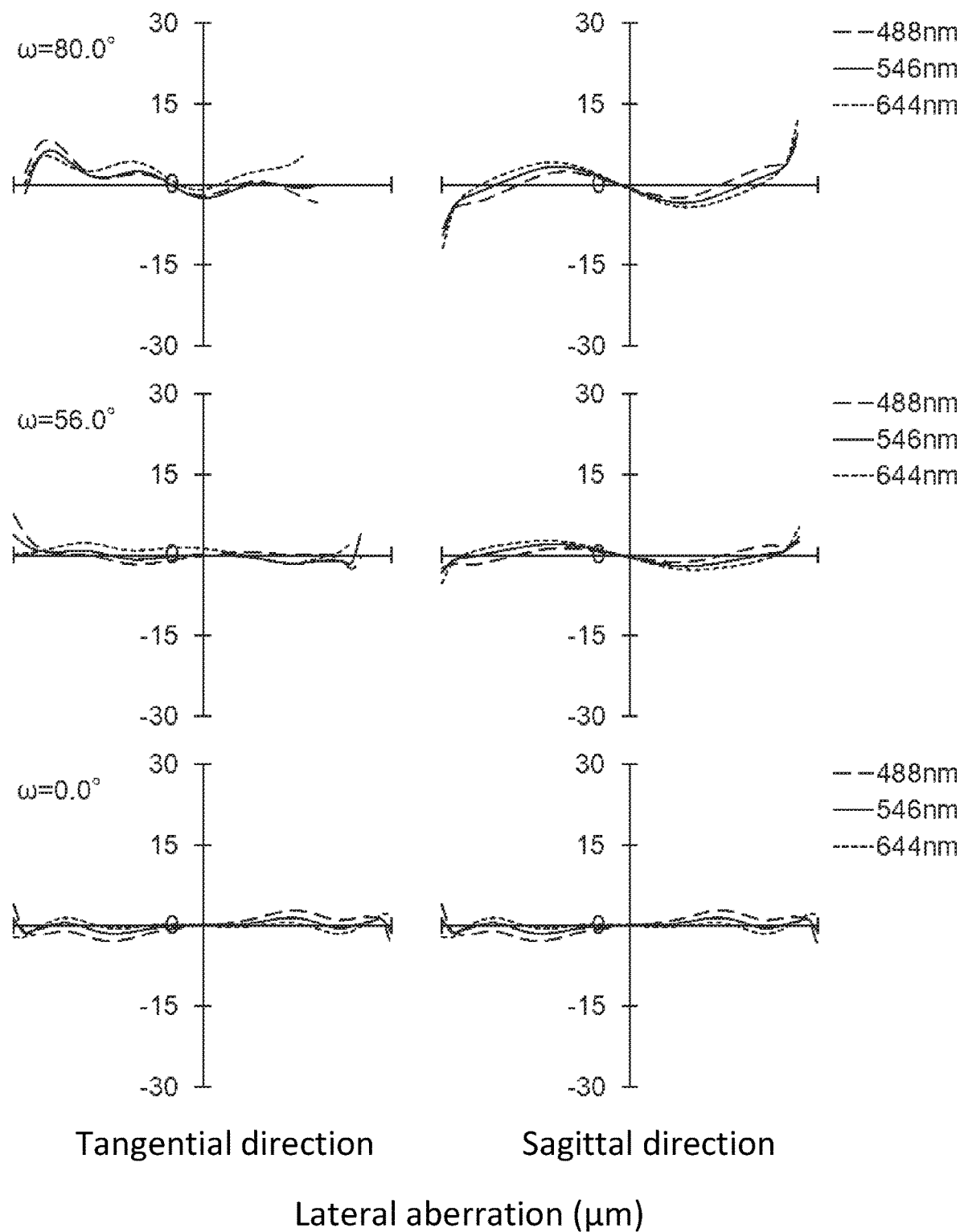
FIG. 14 is an aberration diagram showing a lateral aberration of the imaging lens of FIG. 13.
Figure 15:
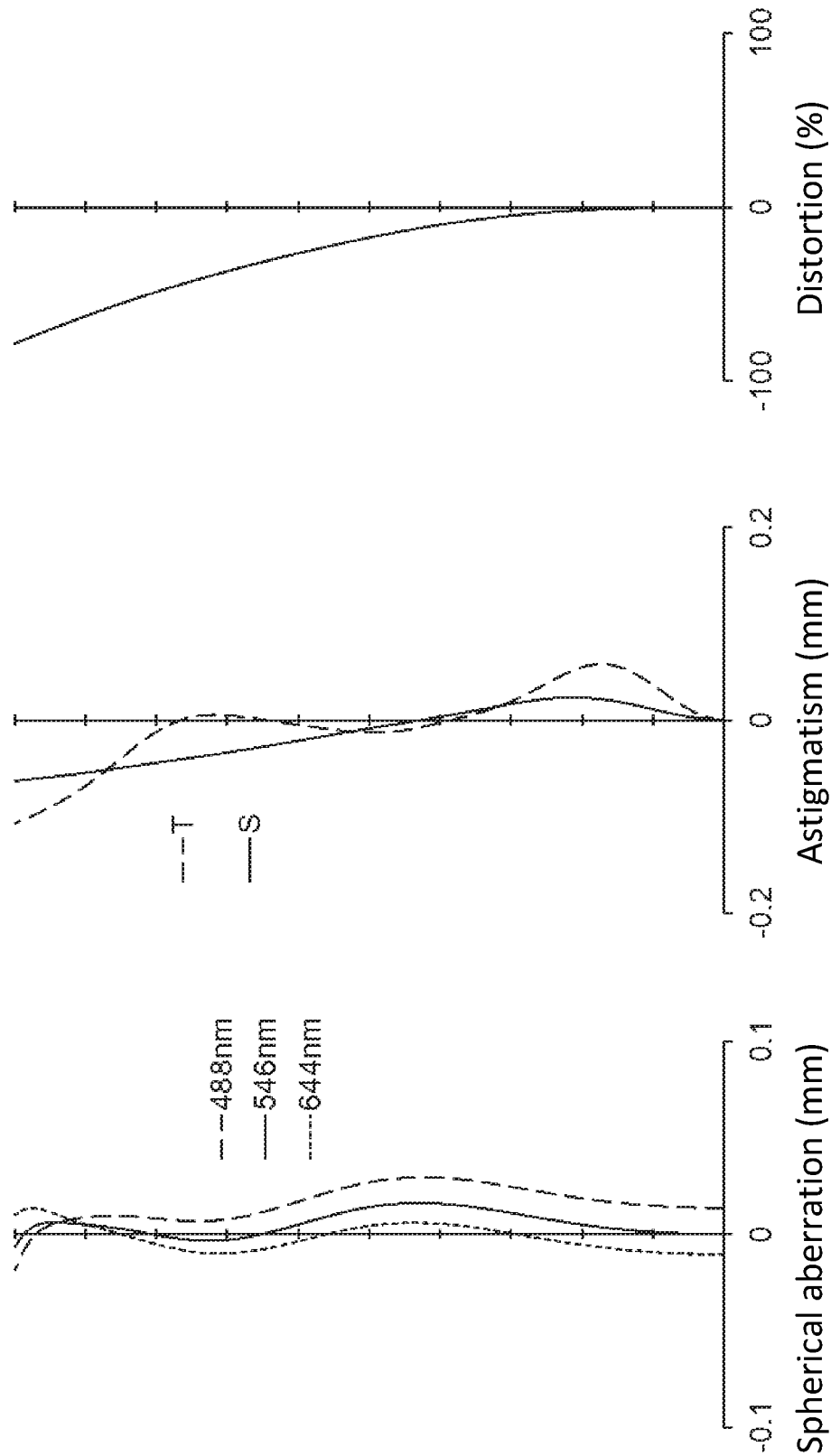
FIG. 15 is an aberration diagram showing a spherical aberration, astigmatism, and a distortion of the imaging lens of FIG. 13.
Figure 16:
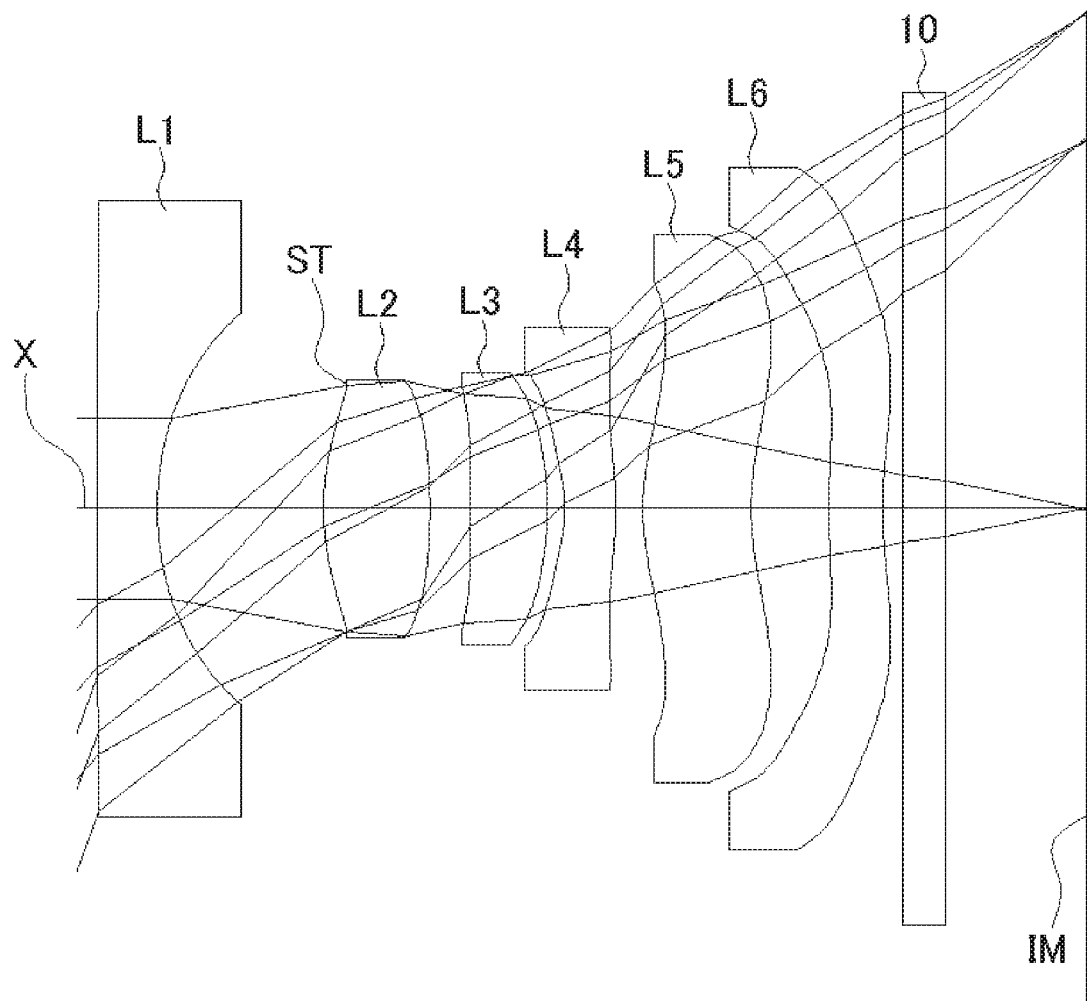
FIG. 16 is a sectional view of a schematic configuration of an imaging lens in Numerical Data Example 6 of the present invention.

FIG. 14 shows a lateral aberration that corresponds to a half angle of view ω, and FIG. 15 shows a spherical aberration (mm), astigmatism (mm), and a distortion (%), respectively. As shown in FIGS. 14 and 15, according to the imaging lens of Numerical Data Example 5, the aberrations are satisfactorily corrected.

Numerical Data Example 6

Basic Lens Data

TABLE 11

| f = 2.22 mm Fno = 2.4 ω = 70.0° | | | | | | | |
|---|---|---|---|---|---|---|---|
| | i | r | d | n | ν | | [mm] |
| | | ∞ | ∞ | | | | |
| L1 | 1 | 100.000 | 0.293 | 1.5371 | 59.7 | f1 = | −2.805 |
| | 2* | 1.483 | 0.809 | (=D12) | | | |
| L2 | 3*(ST) | 1.292 | 0.516 | 1.5371 | 59.7 | f2 = | 1.781 |
| | 4* | −3.167 | 0.197 | | | | |
| L3 | 5* | 40.218 | 0.377 | 1.5371 | 59.7 | f3 = | 2.333 |
| | 6* | −1.289 | 0.082 | | | | |
| L4 | 7* | −0.715 | 0.249 | 1.6689 | 21.9 | f4 = | −2.121 |
| | 8* | −1.644 | 0.131 | | | | |
| L5 | 9* | 1.157 | 0.526 | 1.5371 | 59.7 | f5 = | 7.532 |
| | 10* | 1.363 | 0.380 | (=D56) | | | |
| L6 | 11* | 3.894 | 0.260 | 1.6689 | 21.9 | f6 = | −7.144 |
| | 12* | 2.088 | 0.100 | | | | |
| | 13 | ∞ | 0.210 | 1.5187 | 64.0 | | |
| | 14 | ∞ | 0.679 | | | | |
| (IM) | | ∞ | | | | | |

F1 = 3.068 mm
F2 = 34.844 mm
f23 = 1.211 mm
E4 = 0.415 mm
T4 = 0.249 mm
Φ1A = 2.994 mm
Φ4B = 1.764 mm
Φ5A = 2.218 mm
Φ6B = 3.313 mm
La = 4.737 mm
Hmax = 6.111 mm
Dep = 0.932 mm

TABLE 12

Aspherical surface data

| | k | A4 | A6 | A8 | A10 | A12 | A14 | A16 |
|---|---|---|---|---|---|---|---|---|
| 2 | 0.000E+00 | 5.159E−02 | 2.298E−02 | 0.000E+00 | 0.000E+00 | 0.000E+00 | 0.000E+00 | 0.000E+00 |
| 3 | 0.000E+00 | −9.992E−02 | −1.707E−01 | −3.255E+00 | 2.587E+01 | −1.107E+02 | 2.179E+02 | −1.707E+02 |
| 4 | 0.000E+00 | −2.138E−01 | −1.881E−01 | −3.250E+00 | 2.389E+01 | −8.687E−01 | 1.556E+02 | −1.097E+02 |
| 5 | 0.000E+00 | −2.813E−01 | −9.110E−01 | 2.910E+00 | −5.729E+00 | −7.044E−01 | 5.848E+01 | −8.929E+01 |
| 6 | 0.000E+00 | 8.422E−01 | 1.599E−01 | −3.089E+01 | 1.322E+02 | −2.550E−02 | 2.563E+02 | −1.195E+02 |
| 7 | 0.000E+00 | 3.203E+00 | −7.734E+00 | 4.467E+00 | 1.768E+01 | −1.174E+01 | −4.692E+01 | 5.570E+01 |
| 8 | 0.000E+00 | 1.207E+00 | −2.670E+00 | 4.981E+00 | −7.947E+00 | 9.622E+00 | −7.515E+00 | 2.678E+00 |
| 9 | 0.000E+00 | −8.485E−01 | 9.988E−01 | −1.089E+00 | 6.714E−01 | −2.629E−01 | 9.319E−02 | −4.450E−02 |
| 10 | 0.000E+00 | −5.605E−01 | 4.264E−01 | −3.929E−01 | 3.210E−01 | −2.661E−01 | 1.499E−01 | −3.709E−02 |
| 11 | 0.000E+00 | −4.200E−01 | 2.087E−01 | −1.741E−01 | 2.748E−01 | −2.524E−01 | 1.215E−01 | −2.472E−02 |
| 12 | 0.000E+00 | −4.721E−01 | 3.383E−01 | −2.307E−01 | 1.272E−01 | −4.301E−02 | 7.423E−03 | −5.306E−04 |

The values of the respective conditional expressions are as follows:
D12/f=0.364
f2/f3=0.763
f23/f=0.545
f4/f=−0.955
Φ5A/Φ4B=1.257
|f5|/|f6|=1.054
f6/f=−3.218
D56/f=0.171
La/Hmax=0.775
f/Dep=2.382

Accordingly, the imaging lens of Numerical Data Example 6 satisfies the above-described conditional expressions.

Figure 17:
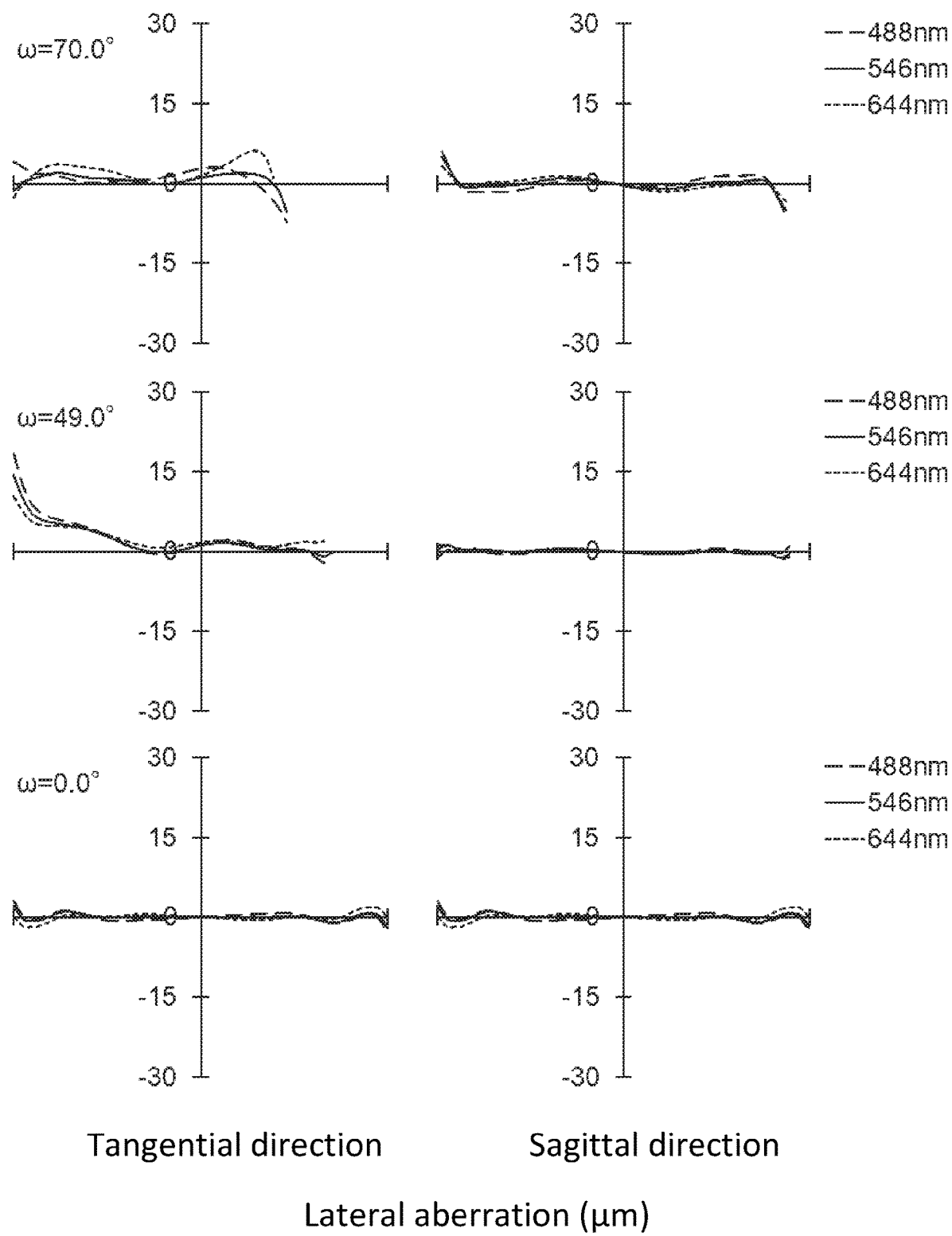
FIG. 17 is an aberration diagram showing a lateral aberration of the imaging lens of FIG. 16.
Figure 18:
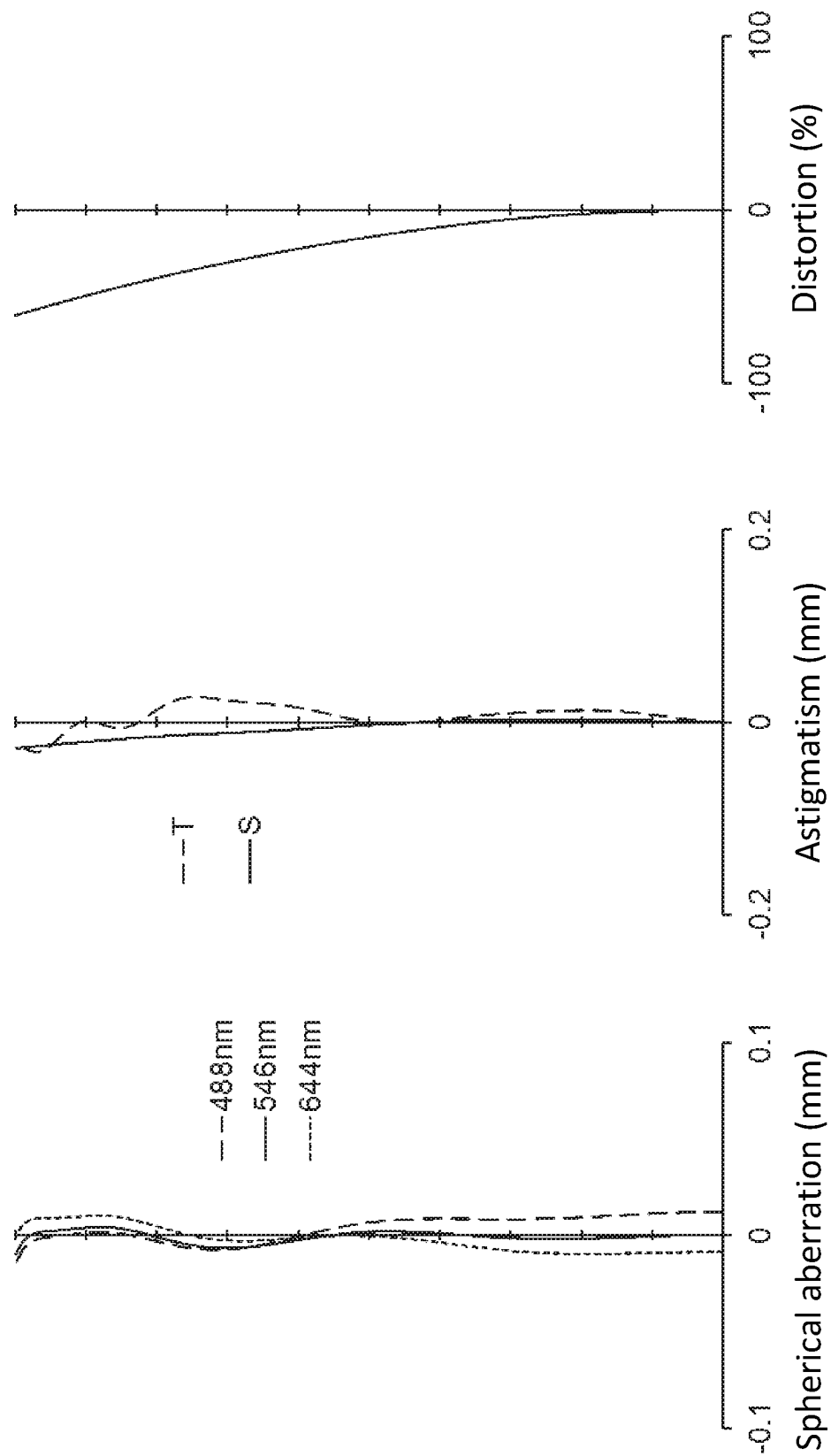
FIG. 18 is an aberration diagram showing a spherical aberration, astigmatism, and a distortion of the imaging lens of FIG. 16.
Figure 19:
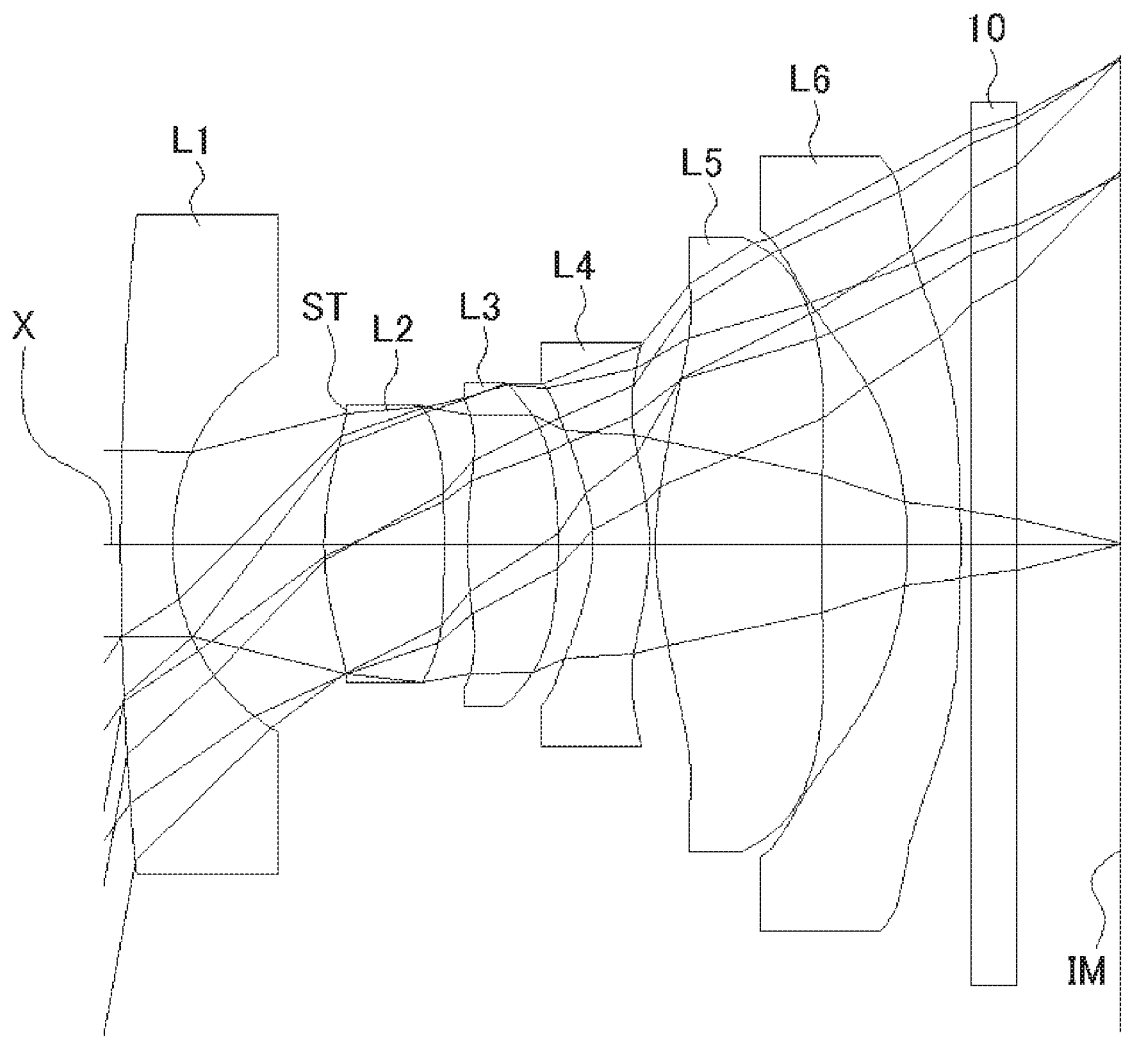
FIG. 19 is a sectional view of a schematic configuration of an imaging lens in Numerical Data Example 7 of the present invention.

FIG. 17 shows a lateral aberration that corresponds to a half angle of view ω, and FIG. 18 shows a spherical aberration (mm), astigmatism (mm), and a distortion (%), respectively. As shown in FIGS. 17 and 18, according to the imaging lens of Numerical Data Example 6, the aberrations are satisfactorily corrected.

Numerical Data Example 7

Basic Lens Data

TABLE 13 f = 1.82 mm Fno = 2.0 ω = 80.0°

| | i | r | d | n | ν | [mm] |
|---|---|---|---|---|---|---|
| L1 | 1 | ∞ | ∞ | | | |
| | 2* | 16.018 | 0.240 | 1.5371 | 59.7 | f1 = −2.188 |
| | | 1.089 | 0.699 | (=D12) | | |

TABLE 13-continued f = 1.82 mm Fno = 2.0 ω = 80.0°

| | i | r | d | n | ν | [mm] |
|---|---|---|---|---|---|---|
| L2 | 3*(ST) | 1.426 | 0.552 | 1.5371 | 59.7 | f2 = 2.562 |
| | 4* | −34.148 | 0.108 | | | |
| L3 | 5* | 1.895 | 0.418 | 1.5371 | 59.7 | f3 = 2.099 |
| | 6* | −2.569 | 0.162 | | | |
| L4 | 7* | −0.779 | 0.260 | 1.6689 | 21.9 | f4 = −4.168 |
| | 8* | −1.226 | 0.029 | | | |
| L5 | 9* | 1.482 | 0.763 | 1.5371 | 59.7 | f5 = 3.264 |
| | 10* | 7.842 | 0.399 | (=D56) | | |
| L6 | 11* | −1.596 | 0.245 | 1.6689 | 21.9 | f6 = −2.930 |
| | 12* | −9.128 | 0.050 | | | |
| | 13 | ∞ | 0.210 | 1.5187 | 64.0 | |
| | 14 | ∞ | 0.481 | | | |
| (IM) | | ∞ | | | | |

F1 = 2.794 mm
F2 = 15.410 mm
f23 = 1.316 mm
E4 = 0.459 mm
T4 = 0.260 mm
Φ1A = 3.046 mm
Φ4B = 1.863 mm
Φ5A = 2.460 mm
Φ6B = 3.581 mm
La = 4.544 mm
Hmax = 10.364 mm
Dep = 0.913 mm

TABLE 14

Aspherical surface data

| i | k | A4 | A6 | A8 | A10 | A12 | A14 | A16 |
|---|---|---|---|---|---|---|---|---|
| 2 | 0.000E+00 | 1.615E−02 | 9.416E−02 | 0.000E+00 | 0.000E+00 | 0.000E+00 | 0.000E+00 | 0.000E+00 |
| 3 | 0.000E+00 | −3.023E−02 | −9.803E−01 | 3.076E+00 | −2.635E−01 | −4.742E+01 | 1.356E+02 | −1.234E+02 |
| 4 | 0.000E+00 | −5.620E−01 | 1.630E+00 | −1.920E+01 | 1.005E+02 | −2.818E+02 | 4.071E+02 | −2.370E+02 |
| 5 | 0.000E+00 | −3.953E−01 | −8.377E−01 | 1.098E+00 | −5.317E+00 | −7.613E+00 | 7.913E+01 | −9.568E+01 |
| 6 | 0.000E+00 | −8.027E−03 | −5.611E−01 | −8.431E+00 | 3.623E+01 | −6.419E+01 | 6.178E+01 | −3.045E+01 |
| 7 | 0.000E+00 | 1.420E+00 | −2.394E+00 | −1.377E−01 | 1.865E+01 | −3.156E+01 | 7.774E+00 | 1.222E+01 |
| 8 | 0.000E+00 | 1.174E−01 | −1.389E+00 | 5.435E+00 | −9.074E+00 | 5.980E+00 | −6.641E−01 | −5.189E−01 |
| 9 | 0.000E+00 | −5.330E−01 | 8.580E−01 | −1.125E+00 | 9.539E−01 | −5.289E−01 | 1.650E−01 | −2.080E−02 |
| 10 | 0.000E+00 | −6.953E−02 | −1.279E−01 | 2.537E−01 | −2.827E−01 | 1.883E−01 | −6.845E−02 | 9.835E−03 |

TABLE 14-continued

| | | | | Aspherical surface data | | | | |
|---|---|---|---|---|---|---|---|---|
| i | k | A4 | A6 | A8 | A10 | A12 | A14 | A16 |
| 11 | 0.000E+00 | 5.380E−02 | −4.999E−02 | −5.665E−01 | 1.140E+00 | −8.380E−01 | 2.803E−01 | −3.618E−02 |
| 12 | 0.000E+00 | 1.942E−02 | −1.640E−01 | 1.102E−01 | −1.444E−02 | −6.628E−03 | 2.122E−03 | −1.729E−04 |

The values of the respective conditional expressions are as follows:
D12/f=0.384
f2/f3=1.221
f23/f=0.723
f4/f=−2.290
Φ5A/Φ4B=1.320
|f5|/|f6|=1.114
f6/f=−1.610
D56/f=0.219
La/Hmax=0.438
f/Dep=1.993

Figure 20:
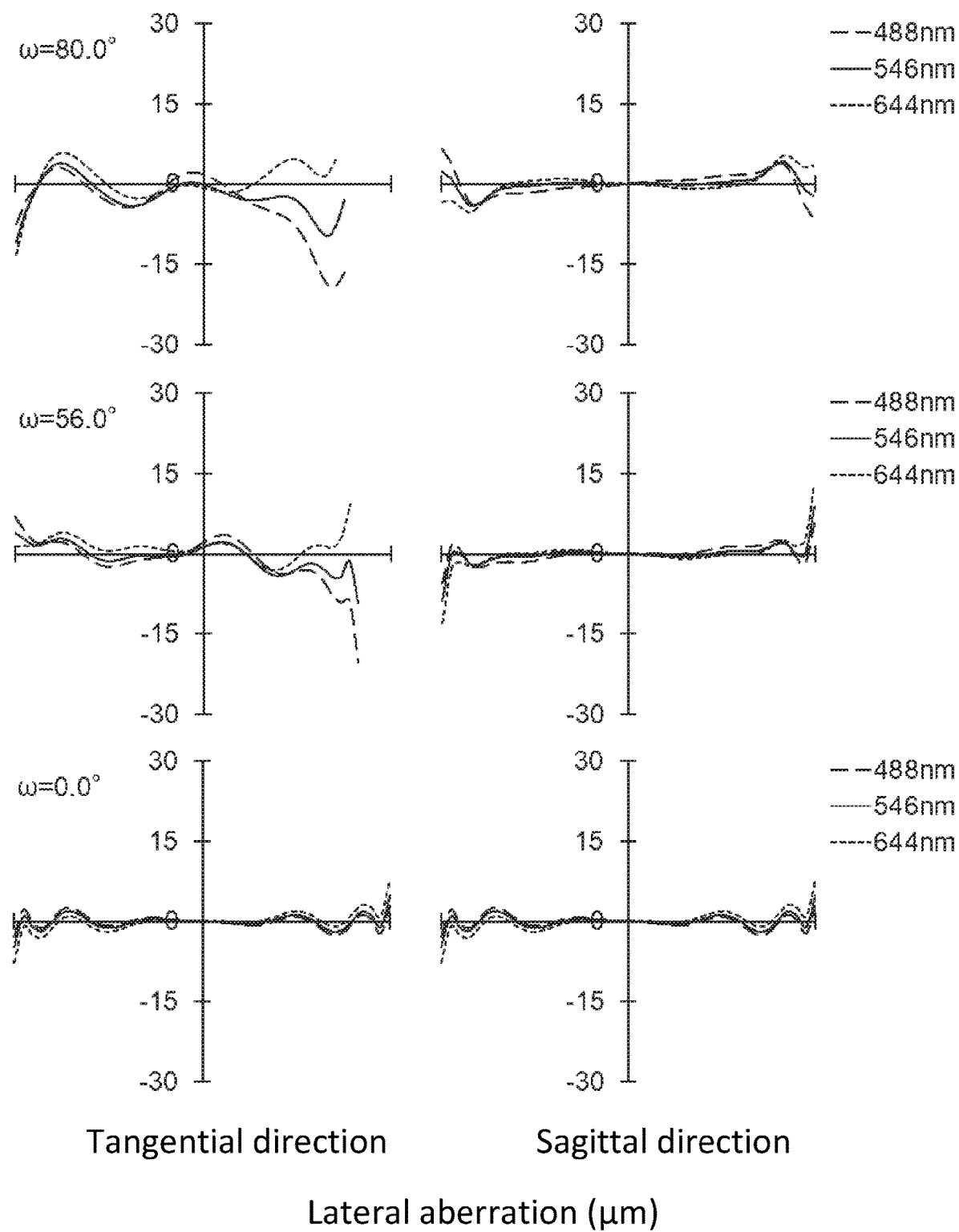
FIG. 20 is an aberration diagram showing a lateral aberration of the imaging lens of FIG. 19.
Figure 21:
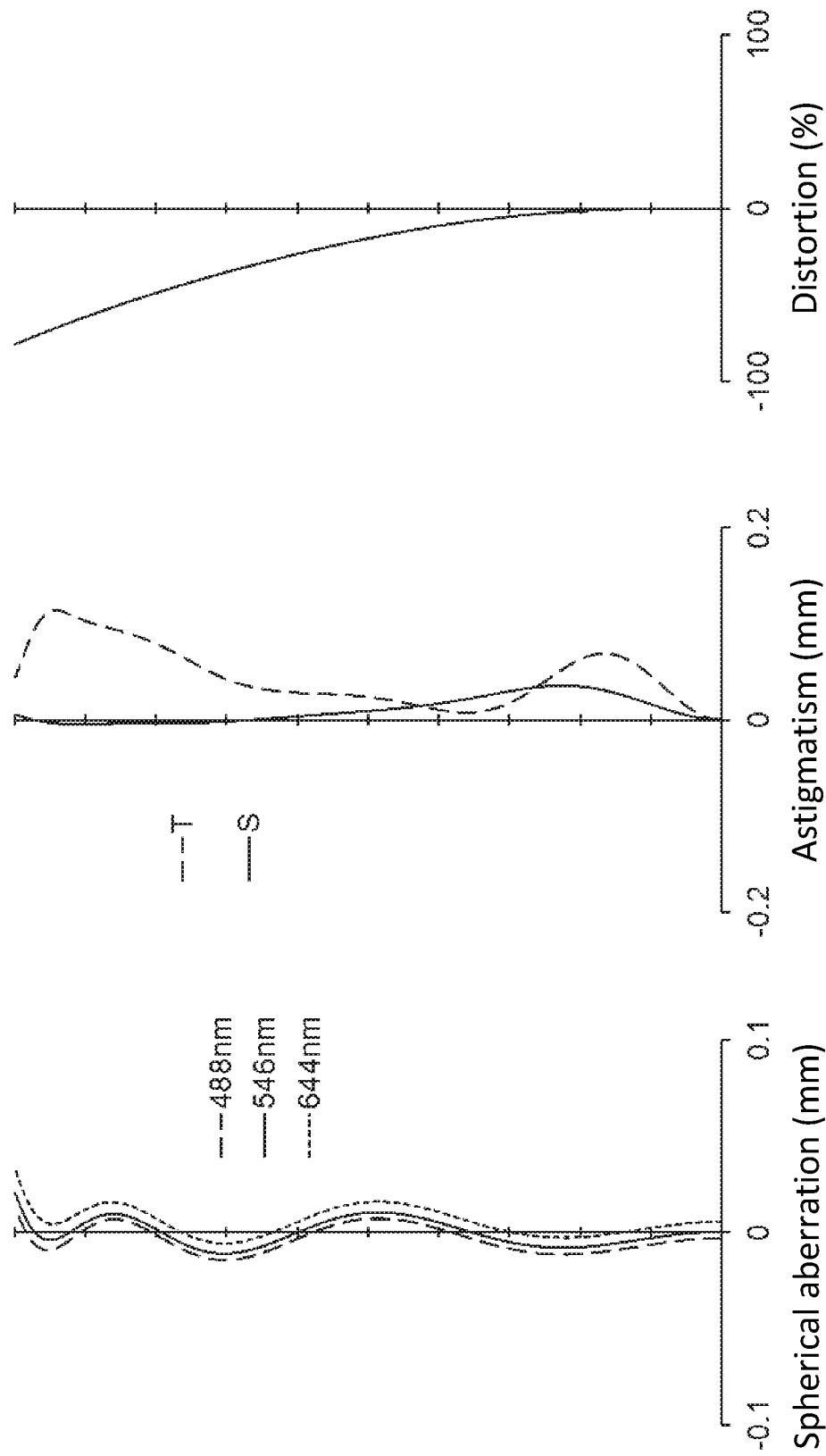
FIG. 21 is an aberration diagram showing a spherical aberration, astigmatism, and a distortion of the imaging lens of FIG. 19.

Accordingly, the imaging lens of Numerical Data Example 7 satisfies the above-described conditional expressions. FIG. 20 shows a lateral aberration that corresponds to a half angle of view ω, and FIG. 21 shows a spherical aberration (mm), astigmatism (mm), and a distortion (%), respectively. As shown in FIGS. 20 and 21, according to the imaging lens of Numerical Data Example 7, the aberrations are satisfactorily corrected.

According to the embodiment of the invention, the imaging lenses have very wide angles of view (2ω) of 120° or greater. According to the imaging lens of the embodiment, it is possible to take an image over a wider range than that taken by a conventional imaging lens, while having a small size.

According to the imaging lenses of the embodiment, the Fnos are as small as 2.0 to 2.5. According to the imaging lens of the embodiment, it is achievable to obtain a sufficiently bright image without providing the above-described electrical circuit to reduce noises in the imaging element.

Accordingly, when the imaging lens of the above-described embodiment is applied in an imaging optical system such as onboard cameras, smartphones, digital cameras, digital video cameras, network cameras, TV conference cameras, fiberscopes, and capsule endoscopes, it is possible to attain both high performance and downsizing of the cameras.

Accordingly, the present invention is applicable to an imaging lens for mounting in a relatively small cameras, such as onboard cameras, smartphones, digital cameras, digital video cameras, network cameras, TV conference cameras, fiberscopes, and capsule endoscopes, it is possible to attain both high performance and downsizing of the cameras.

The disclosure of Japanese Patent Application No. 2017-237737, filed on Dec. 12, 2017, is incorporated in the application by reference.

While the present invention has been explained with reference to the specific embodiment of the present invention, the explanation is illustrative and the present invention is limited only by the appended claims.

What is claimed is:

1. An imaging lens comprising:
a first lens having negative refractive power;
a second lens having positive refractive power;
a third lens having positive refractive power;
a fourth lens having negative refractive power;
a fifth lens; and
a sixth lens having negative refractive power, arranged in this order from an object side to an image plane side,
wherein said fourth lens is formed in a shape so that a surface thereof on the image plane side is convex near an optical axis thereof,
said fourth lens is formed in the shape so that the surface thereof on the image plane side has an aspherical shape having at least one inflection point,
said fifth lens is formed in a shape so that a surface thereof on the image plane side is concave near an optical axis thereof,
said fifth lens is formed in the shape so that the surface thereof on the image plane side has an aspherical shape having at least one inflection point, and
said first lens is disposed away from the second lens by a distance D12 on an optical axis thereof so that the following conditional expression is satisfied:

$0.05<D12/f<0.8$, where f is a focal length of a whole lens system.

2. The imaging lens according to claim 1, wherein said fourth lens has refractive power increasing from the optical axis thereof toward a peripheral portion thereof.

3. The imaging lens according to claim 1, wherein said second lens and said third lens have a composite focal length f23 so that the following conditional expression is satisfied:

$0.3<f23/f<1.2$.

4. The imaging lens according to claim 1, wherein said fourth lens has a focal length f4 so that the following conditional expression is satisfied:

$-4<f4/f<-0.4$.

5. The imaging lens according to claim 1, wherein said fifth lens has a focal length f5 and said sixth lens has a focal length f6 so that the following conditional expression is satisfied:

$0.3<|f5|/|f6|<1.5$.

6. The imaging lens according to claim 1, wherein said sixth lens has a focal length f6 so that the following conditional expression is satisfied:

$-5<f6/f<-0.5$.

7. An imaging lens comprising:
a first lens having negative refractive power;
a second lens having positive refractive power;
a third lens having positive refractive power;
a fourth lens having negative refractive power;
a fifth lens; and
a sixth lens having negative refractive power, arranged in this order from an object side to an image plane side,
wherein said fourth lens is formed in a shape so that a surface thereof on the image plane side is convex near an optical axis thereof,
said fourth lens is formed in the shape so that the surface thereof on the image plane side has an aspherical shape having at least one inflection point, said fifth lens is formed in a shape so that a surface thereof on the image plane side is concave near an optical axis thereof, said fifth lens is formed in the shape so that the surface thereof on the image plane side has an aspherical shape having at least one inflection point, and said sixth lens has an Abbe's number ν6 so that the following conditional expression is satisfied:

$10<\nu 6<40.$

8. The imaging lens according to claim 7, wherein said fourth lens has refractive power increasing from the optical axis thereof toward a peripheral portion thereof.

9. The imaging lens according to claim 7, wherein said second lens and said third lens have a composite focal length f23 so that the following conditional expression is satisfied:

$0.3<f23/f<1.2,$ where f is a focal length of a whole lens system.

10. The imaging lens according to claim 7, wherein said fourth lens has a focal length f4 so that the following conditional expression is satisfied:

$-4<f4/f<-0.4,$ where f is a focal length of a whole lens system.

11. The imaging lens according to claim 7, wherein said fifth lens has a focal length f5 and said sixth lens has a focal length f6 so that the following conditional expression is satisfied:

$0.3<|f5|/|f6|<1.5.$

12. The imaging lens according to claim 7, wherein said sixth lens has a focal length f6 so that the following conditional expression is satisfied:

$-5<f6/f<-0.5,$ where f is a focal length of a whole lens system.

13. An imaging lens comprising:
a first lens having negative refractive power;
a second lens having positive refractive power;
a third lens having positive refractive power;
a fourth lens having negative refractive power;
a fifth lens; and
a sixth lens having negative refractive power, arranged in this order from an object side to an image plane side, wherein said fourth lens is formed in a shape so that a surface thereof on the image plane side is convex near an optical axis thereof, said fourth lens is formed in the shape so that the surface thereof on the image plane side has an aspherical shape having at least one inflection point, said fifth lens is formed in a shape so that a surface thereof on the image plane side is concave near an optical axis thereof, said fifth lens is formed in the shape so that the surface thereof on the image plane side has an aspherical shape having at least one inflection point, and said first lens is disposed away from the second lens by a distance D12 on an optical axis thereof, and said fifth lens is disposed away from the sixth lens by a distance D56 on an optical axis thereof so that the following conditional expression is satisfied:

$D56<D12.$

14. The imaging lens according to claim 13, wherein said fourth lens has refractive power increasing from the optical axis thereof toward a peripheral portion thereof.

15. The imaging lens according to claim 13, wherein said second lens and said third lens have a composite focal length f23 so that the following conditional expression is satisfied:

$0.3<f23/f<1.2,$ where f is a focal length of a whole lens system.

16. The imaging lens according to claim 13, wherein said fourth lens has a focal length f4 so that the following conditional expression is satisfied:

$-4<f4/f<-0.4,$ where f is a focal length of a whole lens system.

17. The imaging lens according to claim 13, wherein said fifth lens has a focal length f5 and said sixth lens has a focal length f6 so that the following conditional expression is satisfied:

$0.3<|f5|/|f6|<1.5.$

18. The imaging lens according to claim 13, wherein said sixth lens has a focal length f6 so that the following conditional expression is satisfied:

$-5<f6/f<-0.5,$ where f is a focal length of a whole lens system.

* * * * *

UNITED STATES PATENT AND TRADEMARK OFFICE
CERTIFICATE OF CORRECTION

PATENT NO.         : 10,809,498 B2  
APPLICATION NO.    : 16/165258  
DATED              : October 20, 2020  
INVENTOR(S)        : Yoji Kubota et al.

Page 1 of 1

It is certified that error appears in the above-identified patent and that said Letters Patent is hereby corrected as shown below:

In the Claims

Column 26, Line 48 Claim 5:  
Error: $0.3 < |f5|/|f61| < 1.5$.  
Correction: $0.3 < |f5|/|f6| < 1.5$.

Signed and Sealed this  
Fifteenth Day of December, 2020

Andrei Iancu  
*Director of the United States Patent and Trademark Office*